US011741437B2

(12) United States Patent
White et al.

(10) Patent No.: US 11,741,437 B2
(45) Date of Patent: Aug. 29, 2023

(54) SCHEDULING TASKS BASED ON CYBER-PHYSICAL-SOCIAL CONTEXTS

(71) Applicant: Microsoft Technology Licensing, LLC, Redmond, WA (US)

(72) Inventors: Ryen William White, Woodinville, WA (US); Omar Shaya, Berlin (DE); Kevin Michael Carter, Kirkland, WA (US); Yongli Ren, Melbourne (AU); Jonathan Liono, Melbourne (AU); Flora Dilys Salim, Melbourne (AU)

(73) Assignee: Microsoft Technology Licensing, LLC, Redmond, WA (US)

( * ) Notice: Subject to any disclaimer, the term of this patent is extended or adjusted under 35 U.S.C. 154(b) by 19 days.

(21) Appl. No.: 16/817,828

(22) Filed: Mar. 13, 2020

(65) Prior Publication Data

US 2021/0287182 A1 Sep. 16, 2021

(51) Int. Cl.
*G06N 20/10* (2019.01)
*G06Q 10/0631* (2023.01)
*G06Q 10/1093* (2023.01)

(52) U.S. Cl.
CPC ......... *G06Q 10/1097* (2013.01); *G06N 20/10* (2019.01); *G06Q 10/06311* (2013.01)

(58) Field of Classification Search
None
See application file for complete search history.

(56) References Cited

U.S. PATENT DOCUMENTS

| 7,233,933 | B2 | 6/2007 | Horvitz et al. |
| 7,499,715 | B2 * | 3/2009 | Carro ............... H04W 4/029 455/456.3 |
| 8,239,865 | B2 | 8/2012 | Toub et al. |
| 9,026,941 | B1 * | 5/2015 | Krueger ............ G06F 16/00 715/812 |
| 9,424,102 | B2 | 8/2016 | Boenisch et al. |
| 9,558,475 | B2 * | 1/2017 | Seligmann ........ G06Q 10/109 |
| 10,408,626 | B2 * | 9/2019 | Kobayashi ........ G06Q 30/0201 |

(Continued)

OTHER PUBLICATIONS

S. Pasandideh, P. Pereira and L. Gomes, "Cyber-Physical-Social Systems: Taxonomy, Challenges, and Opportunities," in IEEE Access, vol. 10, pp. 42404-42419, 2022, doi: 10.1109/ACCESS.2022.3167441. (Year: 2022).*

(Continued)

*Primary Examiner* — Folashade Anderson

(57) ABSTRACT

Methods and systems are disclosed for scheduling a task of a user based on a cyber-physical-social (CPS) context of activities. The present disclosure is directed to increasing the efficiency of performing tasks by grouping tasks with the same or similar task CPS contexts so that they are performed in conjunction with one another. A stream of user activities is received that encompasses the CPS context, tasks are identified and classified based on a CPS context model. The CPS model is trained using CPS context and annotations for identified tasks as input to create classes of tasks. The classes of tasks from the model are used to group similar tasks. The present disclosure enables users to receive recommendations on clustering tasks with the same or similar contexts based on an online tool, a location, and collaborators to be performed together to improve productivity.

15 Claims, 9 Drawing Sheets

(56) References Cited

U.S. PATENT DOCUMENTS

| | | | | |
|---|---|---|---|---|
| 10,448,866 | B1* | 10/2019 | German | A61B 5/0022 |
| 11,118,935 | B2* | 9/2021 | Shahine | G01C 21/3697 |
| 2006/0058948 | A1 | 3/2006 | Blass et al. | |
| 2009/0307693 | A1 | 12/2009 | Do et al. | |
| 2009/0320047 | A1* | 12/2009 | Khan | G06F 9/542 |
| | | | | 719/318 |
| 2013/0159234 | A1* | 6/2013 | Xing | H04M 1/72454 |
| | | | | 706/46 |
| 2014/0067455 | A1* | 3/2014 | Zhang | G06Q 10/109 |
| | | | | 705/7.24 |
| 2016/0342398 | A1* | 11/2016 | Yelsey | G06N 5/02 |
| 2017/0006135 | A1* | 1/2017 | Siebel | H04L 67/12 |
| 2018/0096283 | A1 | 4/2018 | Wang et al. | |
| 2019/0295027 | A1* | 9/2019 | Dunne | G06Q 10/063112 |
| 2021/0255884 | A1* | 8/2021 | Van Rotterdam | H04L 67/18 |

OTHER PUBLICATIONS

M. B. Krishna, "Context-Aware Social Task Resolution Using Feedback Control in Cyber Physical Systems," 2018 IEEE International Conference on Communications Workshops (ICC Workshops), Kansas City, MO, USA, 2018, pp. 1-6, doi: 10.1109/ICCW. 2018.8403551. (Year: 2018).*

"Directories Classifications and Manuals by Topic", Retrieved From: https://www.abs.gov.au/ausstats/abs@.nsf/ViewContent?readform&view=DirClassManualsbyTopic&Action=Expand&Num=6.1.3, Retrieved Date: Jan. 15, 2019, 2 Pages.

White, et al., "Task Duration Estimation", In Proceedings of the Twelfth ACM International Conference on Web Search and Data Mining, Feb. 11, 2019, pp. 636-644.

Abdallah, et al., "Activity Recognition with Evolving Data Streams: A Review", In Journal of ACM Computing Surveys, vol. 51, Issue 4, Jul. 6, 2018, 36 Pages.

Agichtein, et al., "Search, Interrupted: Understanding and Predicting Search Task Continuation", in Proceedings of the 35th International ACM SIGIR Conference on Research and Development in Information Retrieval, Aug. 12, 2012, pp. 315-324.

Anderson, et al., "A Survey of Attention Management Systems in Ubiquitous Computing Environments", In Proceedings of the ACM on Interactive, Mobile, Wearable and Ubiquitous Technologies, Jun. 2018, 27 Pages.

Awadallah, et al., "Supporting Complex Search Tasks", In Proceedings of the 23rd ACM International Conference an Information and Knowledge Management, Nov. 3, 2014, pp. 829-838.

Bailey, et al., "User Task Understanding: A Web Search Engine Perspective", In Proceedings of the NII Shonan Meeting on Whole-Session Evaluation of Interactive Information Retrieval Systems, Oct. 9, 2012, 17 Pages.

Bedny, et al., "A Systemic-Structural Theory of Activity: Applications to Human Performance and Work Design", In Publication of CRC Press, Jul. 27, 2006, 83 Pages.

Trippas, et al., "Learning AboutWork Tasks to Inform Intelligent Assistant Design", In Proceedings of the Conference an Human Information Interaction and Retrieval, Mar. 10, 2019, pp. 5-14.

Bellotti, et al., "Taking Email to Task: The Design and Evaluation of a Task Management Centered Email Tool", In Proceedings of the SIGCHI Conference on Human Factors in Computing Systems, vol. 5, Issue 1, Apr. 5, 2003, pp. 345-352.

Berkel, et al., "The Experience Sampling Method on Mobile Devices", In Journal of ACM Computing Surveys, vol. 50, Issue 6, Dec. 6, 2017, 40 Pages.

Braun, et al., "Using Thematic Analysis in Psychology", In Journal of Qualitative Research in Psychology, vol. 3,Issue 2, Jan. 1, 2006, pp. 77-101.

Broder, Andrei, "A Taxonomy of Web Search", In Proceedings of ACM SIGIR Forum, vol. 36, Issue 2, Sep. 1, 2002, pp. 3-10.

Charmes, Jacques, "Time Use across the World: Findings of a World Compilation of Time-Use Surveys", In Publication of UNDP Human Development Report Office, background Paper, Sep. 2015, 97 Pages.

Chen, et al., "Review of Low Frame Rate Effects on Human Performance", In Journal of IEEE Transactions on Systems, Man, and Cybernetics- Part A: Systems and Humans, vol. 37, Issue 6, Oct. 29, 2007, pp. 1063-1076.

Cheng, et al., "Break It Down: A Comparison of Macro- and Microtasks", In Proceedings of the 33rd Annual ACM Conference on Human Factors in Computing Systems, Apr. 18, 2015, pp. 4061-4064.

Church, et al., "A Large-Scale Study of Daily Information Needs Captured In Situ", In Journal of ACM Transactions an Computer-Human Interaction, vol. 21, Issue 2, Feb. 1, 2014, 46 Pages.

Church, et al., "Understanding the Intent Behind Mobile Information Needs", In Proceedings of the 14th International Conference on Intelligent User Interfaces, Feb. 8, 2009, pp. 247-256.

Clarke, et al., "Successful Qualitative Research: A Practical Guide for Beginners", In Publication of Sage, Mar. 22, 2013, 23 Pages.

Csikszentmihalyi, et al., "The Ecology of Adolescent Activity and Experience", In Journal of Youth and Adolescence .Volume 6, Issue 3, Aug. 9, 2014. pp 281-294.

White, et al., "A Study on the Effects of Personalization and Task Information on Implicit Feedback Performance", In Proceedings of the 15th ACM International Conference on Information and Knowledge Management, Nov. 5, 2006, pp. 297-306.

Dredze, et al., "User Models for Email Activity Management", In Proceedings of the IUI Workshop on Ubiquitous User Modeling, Jan. 13, 2008, 3 Pages.

Graus, et al., "Analyzing and Predicting Task Reminders", In Proceedings of the Conference on User Modeling Adaptation and Personalization, Jul. 13, 2016, pp. 7-15.

Gurrin, et al., "Overview of NTCIR-13 Lifelog-2 Task", In Proceedings of the 13th NTCIR Conference on Evaluation of Information Access Technologies, Dec. 5, 2017, pp. 6-11.

Hua, et al., "Identifying Users' Topical Tasks in Web Search", In Proceedings of the Sixth ACM International Conference on Web Search and Data Mining, Feb. 4, 2013, pp. 93-102.

Iqbal, et al., "Disruption and Recovery of Computing Tasks: Field Study, Analysis, and Directions", In Proceedings of the SIGCHI Conference on Human Factors in Computing Systems, Apr. 28, 2007, pp. 677-686.

Jones, et al., "Beyond the Session Timeout: Automatic Hierarchical Segmentation of Search Topics in Query Logs", In Proceedings of 17th ACM Conference on Information and Knowledge Management, Oct. 26, 2008, pp. 699-708.

Kahneman, et al., "A Survey Method for Characterizing Daily Life Experience: The Day Reconstruction Method", In Journal of Science, vol. 306, Issue 5702, Dec. 3, 2004, pp. 1776-1780.

Kelly, et al., "Display Time as Implicit Feedback: Understanding Task Effects", In Proceedings of the 27th Annual International ACM SIGIR Conference on Research and Development in Information Retrieval, Jul. 25, 2004, pp. 377-384.

Khabsa, et al., "Identifying Task Boundaries in Digital Assistants", In Proceedings of the Web Conference Companion, Apr. 23, 2018, pp. 107-108.

Khalifa, et al., "Pervasive Self-powered Human Activity Recognition Without the Accelerometer", In Proceedings of the IEEE International Conference on Pervasive Computing and Communications, Mar. 23, 2015, pp. 79-86.

Kinsella, et al., "Smart Speaker Consumer Adoption Report", Retrieved From: https://voicebot.ai/wp-content/uploads/2018/10/voicebot-smart-speaker-consumer-adoption-report.pdf, Mar. 2018, 29 Pages.

Kotov, et al., "Modeling and Analysis of Cross-Session Search Tasks", In Proceedings of the 34th international ACM SIGIR Conference on Research and Development in Information Retrieval, Jul. 24, 2011, pp. 5-14.

Kumar, et al., "Learning Task Grouping and Overlap in Multi-Task Learning", In Proceedings of the 29th International Conference on Machine Learning, Jun. 26, 2012, 8 Pages.

Kushmerick, et al., "Automated Email Activity Management: An Unsupervised Learning Approach", In Proceedings of the 10th International Conference on Intelligent User Interfaces, Jan. 9, 2005, pp. 67-74.

(56) References Cited

OTHER PUBLICATIONS

Leont'Ev, Aleksei Nikolaevich, "Activity, Consciousness, and Personality", In Publication of Prentice-Hall Englewood Cliffs, 1978, 196 Pages.

Li, et al., "A Faceted Approach to Conceptualizing Tasks in Information Seeking", In Proceedings of Information Processing and Management, vol. 44, Issue 6, Nov. 2008, pp. 1822-1837.

Li, et al., "Behavior Driven Topic Transition for Search Task Identification", In Proceedings of the 25th International Conference on World Wide Web, Apr. 11, 2016, pp. 555-565.

Li, et al., "Identifying and Labeling Search Tasks via Query-Based Hawkes Processes", In Proceedings of the 20th ACM SIGKDD International Conference on Knowledge Discovery and Data Mining, Aug. 24, 2014, pp. 731-740.

Lin, et al., "Perceptual Visual Quality Metrics: A Survey", In Journal of Visual Communication and Image Representation, vol. 22, Issue 4, May 1, 2011, pp. 297-312.

Liono, et al., "Building a Benchmark for Task Progress in Digital Assistants", In Proceedings of the Twelfth ACM International Conference on Web Search and Data Mining, Feb. 15, 2019, 6 Pages.

Liono, et al., "Inferring Transportation Mode and Human Activity from Mobile Sensing in Daily Life", In Proceedings of the 15th EAI International Conference on Mobile and Ubiquitous Systems: Computing, Networking and Services, Nov. 5, 2018, pp. 342-351.

Liono, et al., "Optimal Time Window for Temporal Segmentation of Sensor Streams in Multi-Activity Recognition", In Proceedings of the 13th EAI International Conference on Mobile and Ubiquitous Systems: Computing, Networking and Services, Nov. 28, 2016, pp. 10-19.

Lucchese, et al., "Identifying Task-Based Sessions in Search Engine Query Logs", In Proceedings of the Fourth ACM International Conference on Web Search and Data Mining, Feb. 9, 2011, pp. 277-286.

Mark, et al., "No Task Left Behind?: Examining the Nature of Fragmented Work", In Proceedings of the SIGCHI Conference on Human factors in Computing Systems, Apr. 2, 2005, pp. 321-330.

Mehrotra, et al., "Hey Cortana! Exploring the Use Cases of a Desktop Based Digital Assistant", In Proceedings of SIGIR 1st International Workshop on Conversational Approaches to Information Retrieval, Dec. 2017, 5 Pages.

Mehrotra, et al., "NotifyMeHere: Intelligent Notification Delivery in Multi-Device Environments", In Proceedings of the Conference on Human Information Interaction and Retrieval, Mar. 10, 2019, pp. 103-111.

Miller, Robert B. ,"The Human Task as Reference for System Interface Design", In Proceedings of the ACM/SIGGRAPH Workshop on User-Oriented Design of Interactive Graphics Systems, Oct. 14, 1976, pp. 97-100.

Nguyen, et al., "SECC: Simultaneous Extraction of Context and Community from Pervasive Signals", In Proceedings of the IEEE International Conference on Pervasive Computing and Communications, Mar. 14, 2016, 9 Pages.

Paul, et al., "Search and Breast Cancer: On Episodic Shifts of Attention over Life Histories of an Illness", In Journal of ACM Transactions on the Web, vol. 10, Issue 2, Apr. 29, 2016, 27 Pages.

Wildman, et al., "Task Types and Team-Level Attributes: Synthesis of Team Classification Literature", In Journal of Human Resource Development Review, vol. 11, Issue 1, Mar. 2012, pp. 97-129.

"International Search Report and Written Opinion Issued in PCT Application No. PCT/US2021/020362", dated May 28, 2021, 11 Pages.

Pedregosa, et al., "Scikit-learn: Machine Learning in Python", In Journal of Machine Learning Research, vol. 12, Oct. 2011, pp. 2825-2830.

Pejovic, et al., "Anticipatory Mobile Computing: A Survey of the State of the Art and Research Challenges", In Journal of ACM Computing Surveys, vol. 47,Issue 3, Apr. 1, 2015, 29 Pages.

Peng, et al., "V3D Enables Real-Time 3D Visualization and Quantitative Analysis of Large-Scale Biological Image Data Sets", In Journal of Nature Biotechnology, vol. 28, Issue 4, Apr. 2010, pp. 348-353.

Peter, "Al Chatbots and Intelligent Assistants in the Workplace", Retrieved From: https://community.spiceworks.com/blog/2964-data-snapshot ai-chatbots_and-intelligent-assistants-in-the-workplace, Apr. 2, 2018, 9 Pages.

Pfautz, Jonathan D., "Depth Perception in Computer Graphics", In Publication of University of Cambridge, Computer Laboratory, Sep. 2002, 182 Pages.

Qadir, et al., "Activity Modeling in Email", In Proceedings of the Conference of the North American Chapter of the Association for Computational Linguistics: Human Language Technologies, Jun. 12, 2016, pp. 1452-1462.

Rahaman, et al., "Using Big Spatial Data for Planning User Mobility", In Encyclopedia of Big Data Technologies, Feb. 19, 2018, 9 Pages.

Ren, et al., "A Location-Query-Browse Graph for Contextual Recommendation", In Journal of IEEE Transactions on Knowledge and Data Engineering, vol. 30, Issue 2, Feb. 1, 2018, pp. 204-218.

Ren, et al., "Analyzing Web Behavior in Indoor Retail Spaces", In Journal of the Association for Information Science and Technology, vol. 68, Issue 1, Jan. 1, 2017, pp. 62-76.

Ren, et al., "Understanding the Predictability of User Demographics from Cyber-Physical-Social Behaviours in Indoor Retail Spaces", In Journal of EPJ Data Science, vol. 7, Jan. 3, 2018, 21 Pages.

Rose, et al., "Understanding User Goals in Web Search", In Proceedings of the 13th International Conference on World Wide Web, May 17, 2004, pp. 13-19.

Saastamoinen, et al., "Search Task Features in Work Tasks of Varying Types and Complexity", In Journal of the Association for Information Science and Technology, vol. 68, Issue 5, May 1, 2017, pp. 1111-1123.

Santos, et al., "An IoT-Based Mobile Gateway for Intelligent Personal Assistants on Mobile Health Environments", In Journal of Network and Computer Applications, vol. 71, Aug. 1, 2016, 13 Pages.

Sarker, et al., "Mining User Behavioral Rules from Smartphone Data Through Association Analysis", In Proceedings of the Advances in Knowledge Discovery and Data Mining, Springer, Mar. 19, 2018, pp. 450-461.

Shen, et al., "A Hybrid Learning System for Recognizing User Tasks from Desktop Activities and Email Messages", In Proceedings of the International Conference on Intelligent User Interfaces, Jan. 29, 2006, pp. 86-92.

Sigg, et al., "The Telepathic Phone: Frictionless Activity Recognition From WiFi-RSSI", In Proceedings of the IEEE International Conference on Pervasive Computing and Communications, Mar. 24, 2014, pp. 148-155.

Sohn, et al., "A Diary Study of Mobile Information Needs", In Proceedings of the SIGCHI Conference on Human Factors in Computing Systems, Apr. 5, 2008, pp. 433-442.

Stisen, et al., "Task Phase Recognition and Task Progress Estimation for Highly Mobile Workers in Large Building Complexes", In Journal of Pervasive and Mobile Computing, vol. 38, Jul. 1, 2017, pp. 418-429.

Stumpf, et al., "Predicting User Tasks: I Know What You're Doing", In 20th National Conference on Artificial Intelligence, Workshop on Human Comprehensible Machine Learning, Jul. 9, 2005, 6 Pages.

Sun, et al., "Contextual Intent Tracking for Personal Assistants", In Proceedings of the 22nd ACM SIGKDD International Conference on Knowledge Discovery and Data Mining, Aug. 13, 2016, pp. 273-282.

Trippas, et al., "Informing the Design of Spoken Conversational Search", In Proceedings of the Conference on Human Information Interaction and Retrieval, Mar. 11, 2018, pp. 32-41.

\* cited by examiner

400A

| Task ID | Current | Group ID | User | Duration | Location | Task Description | CPS Context Value |
|---|---|---|---|---|---|---|---|
| 0001 | X | | A | 15 | None | Send Email to B | (10, 0, 5) |
| 0002 | | | A | 30 | None | Write Memo about Y on computer | (10, 0, 0) |
| 0003 | | | B | 15 | None | Travel to Office | (0, 10, 0) |
| 0004 | | | A | 60 | Room X | Meet with B and C | (0, 10, 10) |
| 0005 | | | C | 60 | Room X | Meet with A and B | (0, 10, 10) |
| 0006 | | | D | 15 | None | Consult with A and B | (0, 10, 10) |
| 0007 | | | A | 20 | None | Search Y on Web | (10, 0, 0) |

| Task ID | Current | Group ID | User | Duration | Location | Task Description | CPS Context Value |
|---|---|---|---|---|---|---|---|
| 0001 | X | 1 | A | 15 | None | Send Email to B | (10, 0, 5) |
| 0002 | | 1 | A | 30 | None | Write Memo about Y on computer | (10, 0, 0) |
| 0003 | | | B | 30 | None | Travel to Office | (0, 10, 0) |
| 0004 | | 2 | A | 60 | Room X | Meet with B and C | (0, 10, 10) |
| 0005 | | 2 | C | 60 | Room X | Meet with A and B | (0, 10, 10) |
| 0006 | | 2 | D | 15 | Room X | Consult with A and B | (0, 10, 10) |
| 0007 | | 1 | A | 20 | None | Search Y on Web | (10, 0, 0) |

FIG. 4B

SCHEDULING TASKS BASED ON CYBER-PHYSICAL-SOCIAL CONTEXTS

BACKGROUND

Intelligent assistants provide a useful way for people to manage many of their tasks, including personal and work-related activities. In recent years, there has been growing interest in applications of these assistants in workplaces to empower employees. Despite the potential for these assistants to help people complete their work tasks (at work, at home, or on-the-go), penetration of these assistants in workplaces is limited, and task support is restricted to low-level tasks such as controlling devices, seeking information, or entertainment. In work settings in particular, intelligent assistants are mostly used for basic tasks such as voice dictation, calendar management, and customer/employee support. Recently, the influences of cyber, physical, and social behaviors were used to analyze information seeking activities indoors. However, these studies do not focus on work tasks, including the impact of task properties (cyber, physical, or social factors), or the support that intelligent assistants can offer to help workers complete their tasks. Further, it is challenging to identify tasks due to noisy environmental aspects of the dynamics of human activities. Unreliable or subjective annotations and spontaneous human actions in daily life may make human task identification inaccurate. To increase the uptake of intelligent assistants for work tasks, there is a need to be able to identify tasks accurately and then to schedule them efficiently based on commonalties between tasks.

It is with respect to these and other general considerations that the aspects disclosed herein have been made. Also, although relatively specific problems may be discussed, it should be understood that the examples should not be limited to solving the specific problems identified in the background or elsewhere in this disclosure.

SUMMARY

According to the present disclosure, the above and other issues may be resolved by generating a cyber-physical-social (CPS) context model based on the collected contexts of tasks and generating a group of anticipated tasks according to the CPS context model for improving productivity of performing the anticipated tasks.

Systems and methods described herein collect contexts of a task based on cyber activities, physical activities, and social activities. The CPS context is based on CPS activity data collected from CPS activity sensors including one or more of a cyber context feature, a physical context feature, and a social context feature. Tasks are identified based on the generated CPS context and one or more annotations associated with the CPS context. Annotations may be provided by the user. A trained CPS context model allows for classifying identified task into classes. Once an identified task has a class, it may be grouped with one or more tasks having the same class and the group of tasks may be scheduled together.

This Summary is provided to introduce a selection of concepts in a simplified form, which is further described below in the Detailed Description. This Summary is not intended to identify key features or essential features of the claimed subject matter, nor is it intended to be used to limit the scope of the claimed subject matter. Additional aspects, features, and/or advantages of examples will be set forth in part in the following description and, in part, will be apparent from the description, or may be learned by practice of the disclosure.

BRIEF DESCRIPTIONS OF THE DRAWINGS

Non-limiting and non-exhaustive examples are described with reference to the following figures.

FIGS. 4A-B illustrate examples of scheduling tasks by grouping the tasks based on CPS Context according to an example system with which the disclosure may be practiced in accordance with aspects of the present disclosure.

Figure 5:
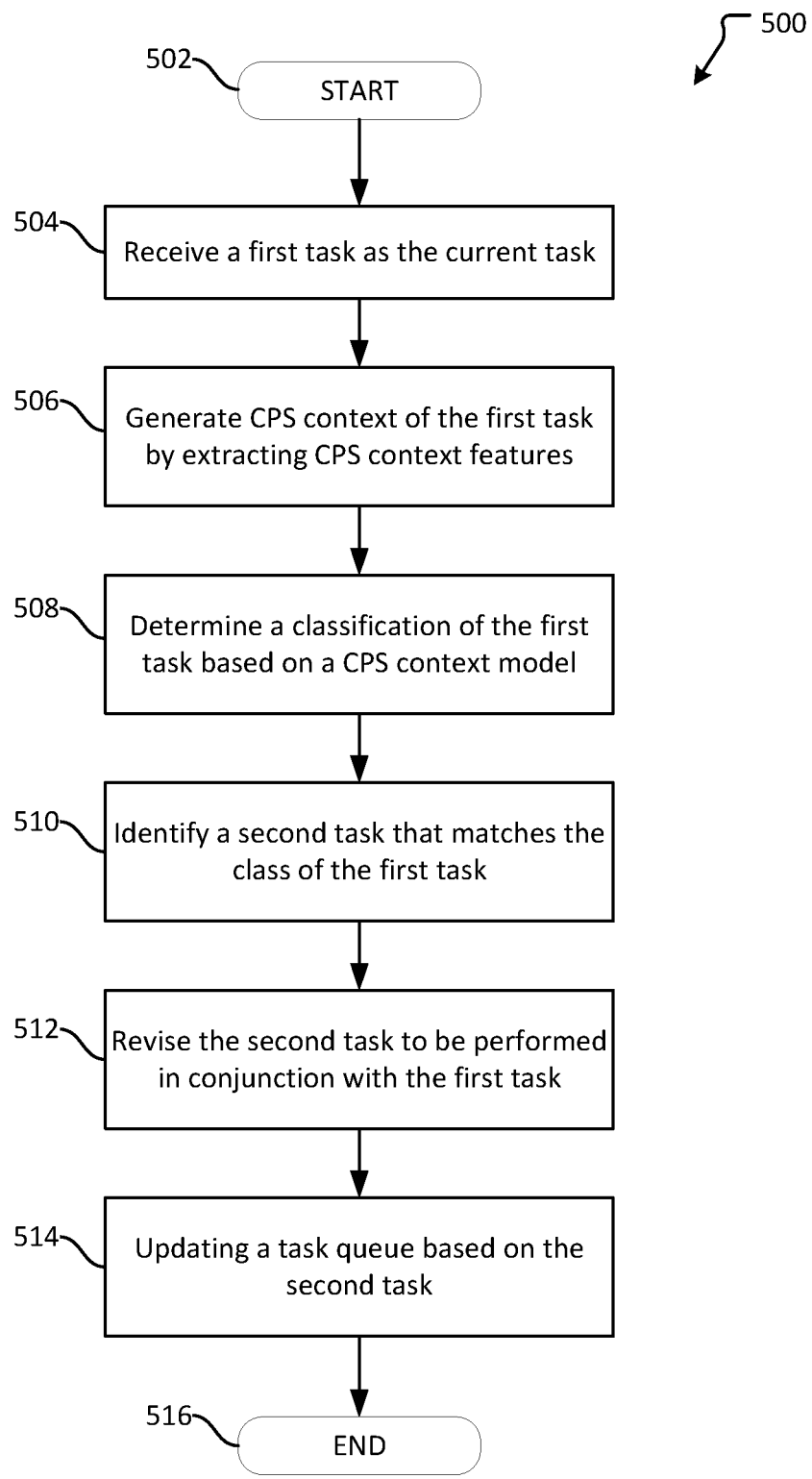

FIG. 5 illustrates an example method of generating a CPS context for a task with which aspects of the present disclosure may be practiced in accordance with aspects of the present disclosure.

Figure 6:
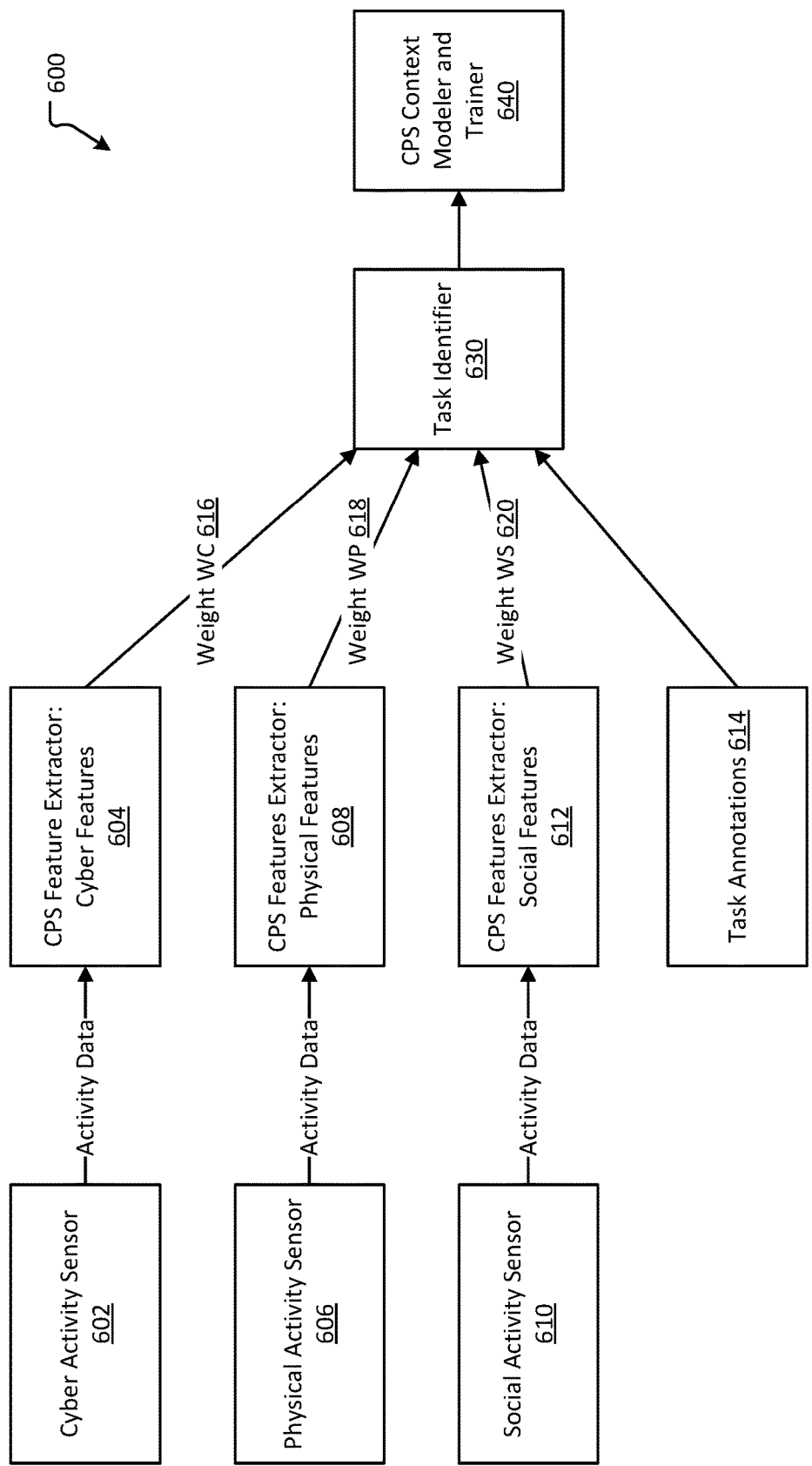

FIG. 6 illustrates an example of generating a CPS context model according to an example system with which the disclosure may be practiced in accordance with aspects of the present disclosure.

Figure 7:
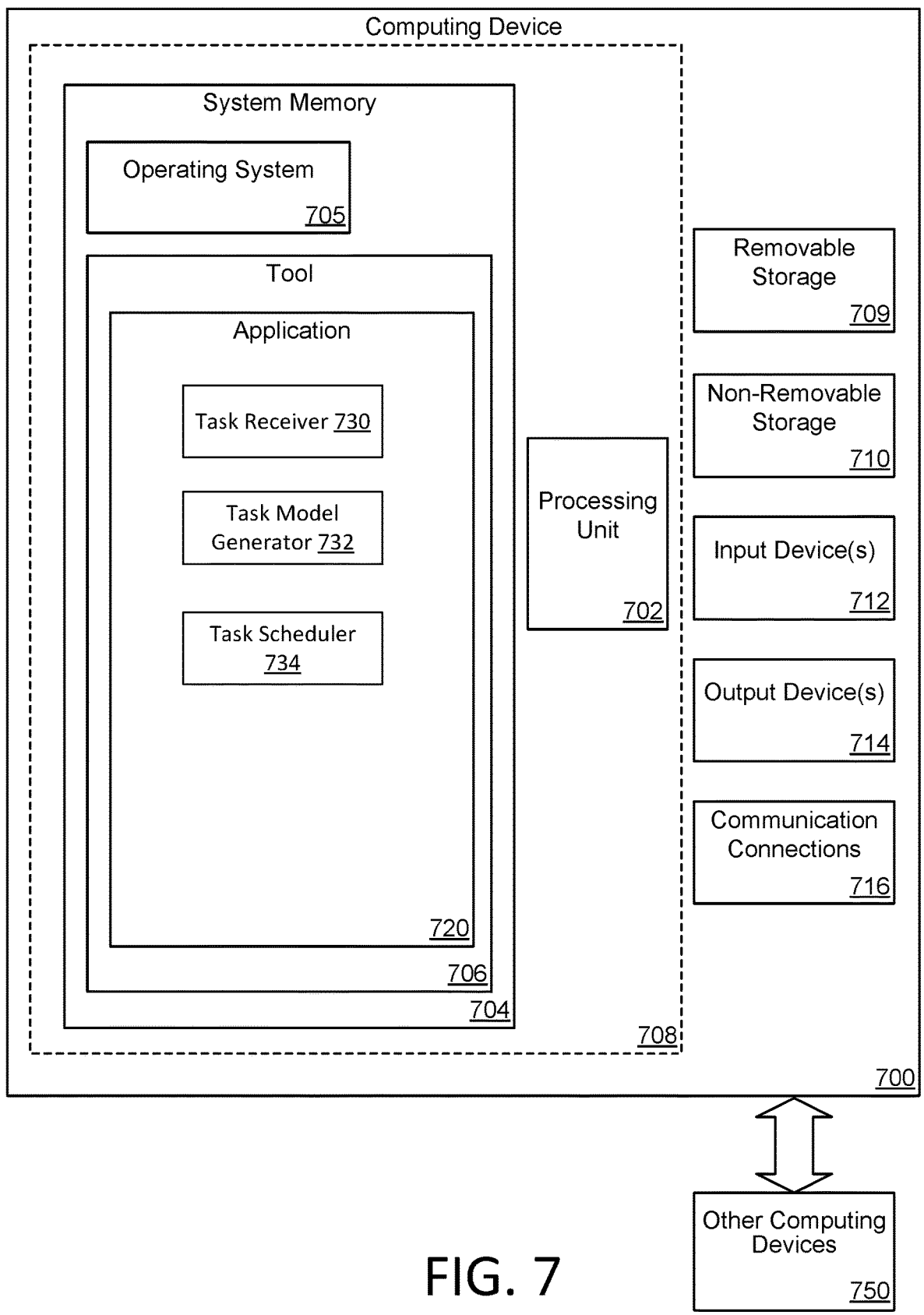

FIG. 7 is a block diagram illustrating example physical components of a computing device with which aspects of the disclosure may be practiced.

Figure 8A:
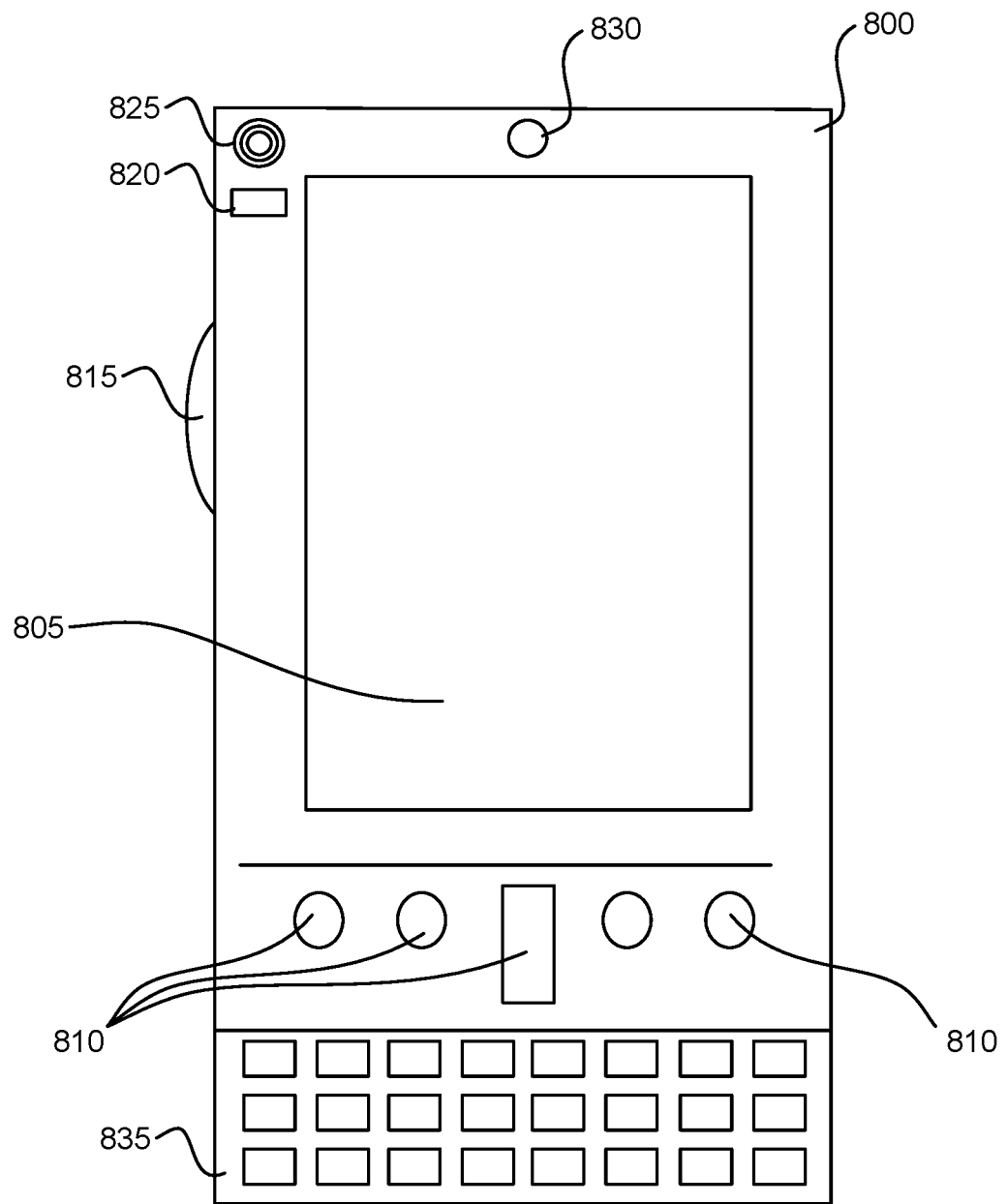

FIG. 8A is a simplified diagram of a mobile computing device with which aspects of the present disclosure may be practiced.

Figure 8B:
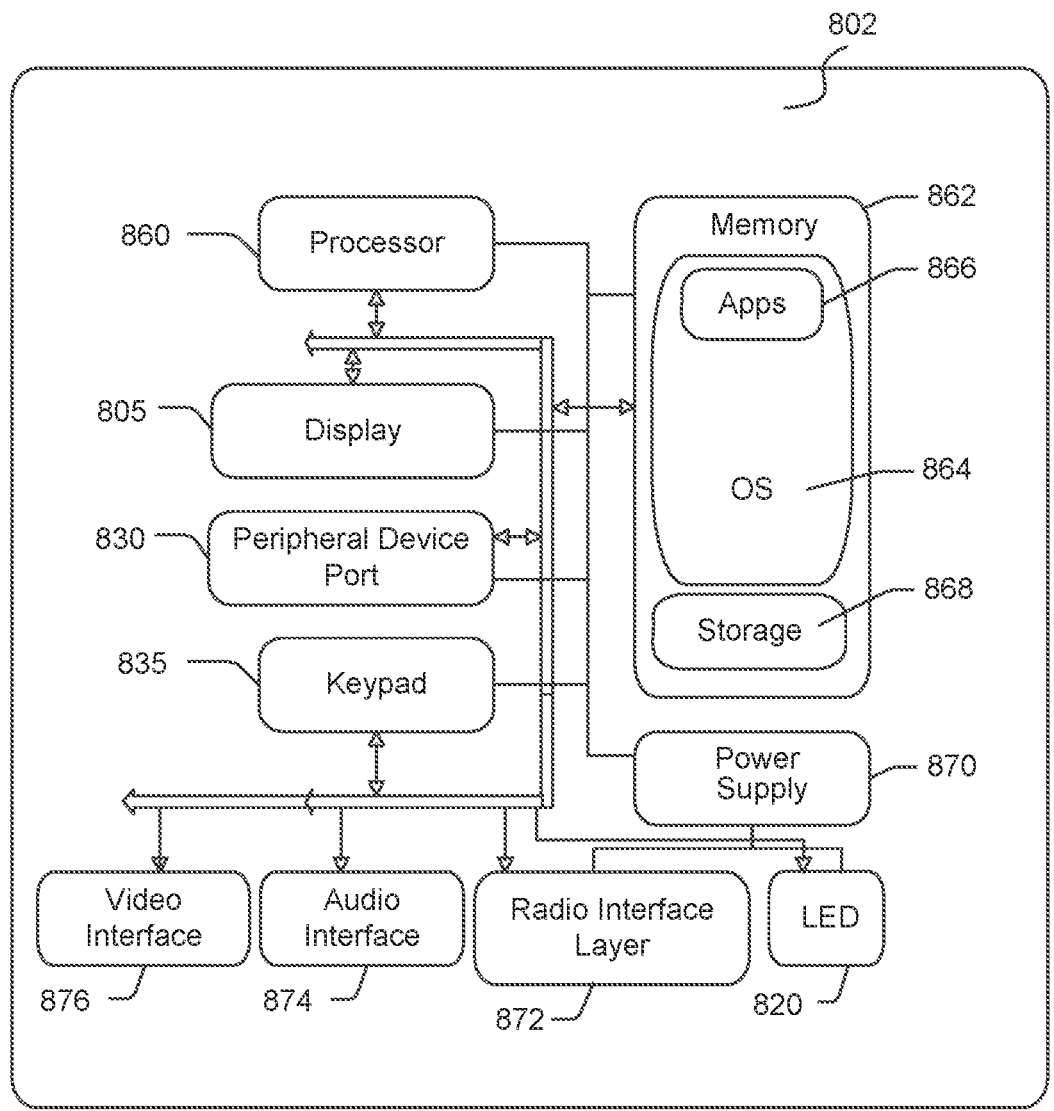

FIG. 8B is another simplified block diagram of a mobile computing device with which aspects of the present disclosure may be practiced.

DETAILED DESCRIPTION

Various aspects of the disclosure are described more fully below with reference to the accompanying drawings, which from a part hereof, and which show specific example aspects. However, different aspects of the disclosure may be implement in many different forms and should not be construed as limited in the aspects set forth herein; rather, these aspects are provided so that this disclosure will be thorough and complete, and will fully convey the scope of the aspects to those skilled in the art. Aspects may be practiced as methods, systems or devices. Accordingly, aspects may take the form of a hardware implementation, an entirely software implementation or an implementation combining software and hardware aspects. The following detailed description is, therefore, not to be taken in a limiting sense.

The present disclosure relates to systems and methods for scheduling tasks based on cyber-physical-social contexts. Efficiency of performing tasks by a user is improved through scheduling tasks by grouping tasks based on cyber-physical-social (CPS) contexts of the tasks according to the CPS context models. Such representations may be used in artificial intelligent assistants to schedule tasks by grouping select tasks according to context factors based on cyber activities, physical activities, and social activities. Aspects use activity sensors to collect user's cyber activities, physical activities, and social activities, analyze the activities to determine context features for generating cyber-physical-social (CPS) contexts for identifying a task. The aspects further trains CPS context models that classifies tasks into classes. Aspects further use the CPS context model on a CPS context of a task that is currently being undertaken by a user to schedule another task, where the two tasks have a matching pair of classes whereby grouping the two tasks would improve productivity of the task performance.

The main challenges in identifying human tasks relate to noisy environmental aspects of the dynamics of human activities. Unreliable or subjective annotations and spontaneous human actions in daily life may make human task identification inaccurate. Tasks that a user is currently engaged in may be identified based on contextual information that is captured by sensors.

A task comprises a user or a person performing some activity(ies) to attain a goal. Data about tasks and activities may be collected by receiving activity data from activity sensors. The activity sensors may monitor and collect various activity data from cyber activities, physical activities, and social activities. In some aspects, a task corresponds to any one or more of cyber context, physical context, and social context. A combination of cyber context, physical context, and social context is represented by a CPS context. A CPS context is a context based on a combination of CPS context features. A CPS context feature is a set of CPS activities that constitute a CPS context. CPS activities are activities of users as sensed by activity sensors that relate to cyber activities, physical activities, and social activities. The activity sensors sense the activities and provide activity data.

Cyber activities involve cyberspace, where the user is either acting alone or with other people. Such activities include, but are not limited to, use of electronic devices and/or computers to complete tasks. Such electronic devices and/or computers may include a desktop, a laptop, a phone, a tablet, a specialized computing equipment, a copier, a printer, and scanner. The user may be using the electronic devices and/or computers for email applications, word processing, web browsing, web searching, performing online transactions, and online chatting, for example. Tasks with cyber contexts may include preparing and sending an email, searching for information through a web search, using some electronic device to accomplish a task, and online activities such as online bank transactions. Sensors may be used to collect cyber activity data. For example, sensors such as a proximity sensor that is attached to an electronic device or a user may detect that the user is located in proximity to the electronic device. Other cyber sensors include logging and/or monitoring programs that may be used to monitor and log user operations on an electronic device and a computer. In some aspects, network monitors may monitor data traffic on the network from or to the electronic device and/or the computer.

Physical activities generally relate to the body rather than the mind. In some aspects, physical activities include, but are not limited to, cleaning, moving, eating, and physical work. Tasks with physical contexts may include traveling, eating meals, taking breaks, and face-to-face meetings with other people, for example. In some aspects, sensors may be used to collect physical activity data. Sensors for collecting physical activity data may include global positioning system sensors and motion sensors to monitor locations and movements of people.

Social activities generally relate to social interactions with other people or collaborators to complete a task. Examples of tasks with social activities include, but are not limited to, having meetings with others, having meals, performing a task that relates to customer care, project work and communications. Sensors for collecting social activity data may include proximity and positioning sensors that are attached to individual users for detecting people at specific locations and in proximity for a prolonged time for likely a meeting between the individual users. In some other aspects, various locations such as meeting rooms may be equipped with sensors for detecting occupants. Social activities also include collaborative online tasks: use of calendar applications for scheduling collaborative activities, online chat, generating and managing emails, for example. In this case, applications may be used as sensors to capture such social activities. For example, a calendar application may sense that a meeting has taken place or is scheduled to take place, the identity of the meeting attendees, and the location of the meeting.

In some aspects, input from users may be received through the electronic devices to annotate information about tasks and activities. The input may be received through a graphical user interface of an electronic device or a computer, for example (in-situ annotations to a task). Users may annotate a task by selecting a task and entering attributes of the task, date, time, subject matter, people whom interacted with, and a location, for example. The users may annotate tasks in response to questions posed to the user by the system. The question may be "have you used a computer to complete this task?," have you met with another person to complete this task?" for example.

A context of a task is data that describes a set of conditions where the task is performed by one or more people. The context may be based on various types of activities, including cyber activities, physical activities, and social activities, for example. A cyber context may be based on cyber activities; a physical context may be based on physical activities; and a social context may be based on social activities. A CPS context may be a context based on a combination of a cyber-context, a physical context, and a social context. In some aspects, the CPS context may be based on a weighed combination of the cyber context, the physical context, and the social context. A CPS context may model a relationship between CPS contexts of users and the corresponding behaviors related to the undertaken tasks.

Figure 1:
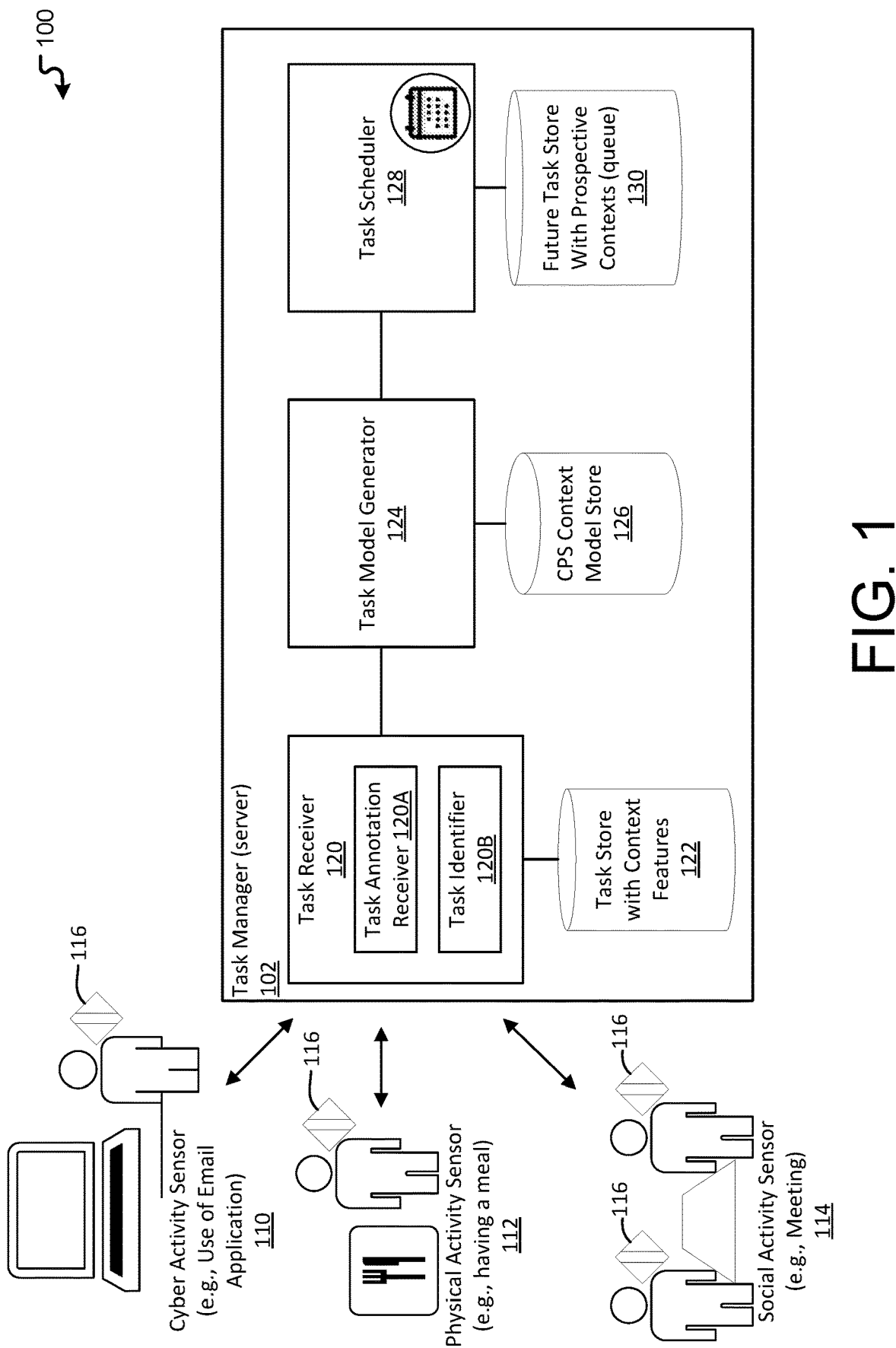
FIG. 1 illustrates an overview of an example system for a task management system in accordance to aspects of the present disclosure.

FIG. 1 illustrates an overview of an example system for a task management in accordance with aspects of the present disclosure. System 100 may include activity sensors (e.g., a cyber activity sensor 110, a physical activity sensor 112 and a social activity sensor 114) and a task manager 102.

Cyber activity sensor 110 senses and collects cyber activities (e.g., online operations) of a user as the user uses electronic devices and/or computers for performing an online task such as emailing, for example. The cyber activity sensor 110 may be a program that is installed in the electronic device and/or the computer that monitors user operations on the electronic device and/or the computer. A user sensor 116 may sense and collect user activities. The user sensor 116 may comprise a proximity sensor, a global positioning system (GPS) sensor, a motion sensor, and other sensor to detect user activities. The user sensor 116 may communicate with the cyber activity sensors 110 to determine when the user is operating the electronic device and/or the computer for the task based on the cyber context. The cyber activity sensor 110 may receive input from the user to annotate the task in the cyber context that is being performed by the user. The cyber activity sensor 110 and the user sensor 116 may transmit activities and task data to the task manager 102 for storage and for further analysis. The activities and task data may include, but are not limited to, the cyber nature of the task (online), names of computer program applications, location, movement, date, start time, end time, a time duration, and an identifier of the user.

Physical activity sensor 112 senses and collects physical activities of the user. In some aspects, a physical activity may comprise an activity that requires physical movement of the user, such as but not limited to, having a meal or doing an exercise, for example. The physical activity sensor 112 may be a proximity sensor installed at a location such as at a table in a dining room or an exercise room. In conjunction with the user sensors 116 held by respective people in the room or by the physical activity sensor 112 itself, the physical activity sensor 112 may determine that a task with a physical context is taking place. The physical activity sensor 112 and the user sensor 116 may transmit activities and task data to the task manager 102 for storage and for further analysis. The physical activities and task data may include, but are not limited to, location, movement, date, start time, end time, a time duration, and an identifier of the user. Additionally or alternatively, the physical activity sensor may include accelerometer, gyroscope, magnetometer sensors, a type of movement by the user, and semantic labels of locations that the user has visited (e.g., home, office, a meeting room, and train stations).

Social activity sensor 114 senses and collects social activity data of the users. In some aspects, a social activity may comprise an activity that is jointly performed by multiple users. The social activity sensor 114 may be a proximity sensor that is installed in a meeting room or table where people may gather for a meeting. In conjunction with the user sensors 116 held by respective people in the meeting room or by the social activity sensor 114 itself, the social activity sensor 114 may determine that a task with a social context is taking place. The social activity sensor 114 and the user sensor 116 may transmit activities and task data to the task manager 102 for storage and for further analysis. The activities and task data may include, but not limited to, the social nature of the task, location, movement, date, start time, end time, a time duration, and an identifier of the user.

In some aspects, a task may be associated with a combination of the cyber context, the physical context, and the social context. For example, a task of having a face-to-face meeting among users to jointly draft a document may involve a cyber-context of using online word processing applications, a physical activity of meeting face-to-face in a meeting room, and a social activity of communicating with each other during the meeting. In this way, a task may be associated with a CPS context with various levels of emphasis in each type of contexts. The CPS context may be represented by a combination of multiple vectors, each vector corresponding to respective types of contexts with a comparative degree of involvement. A task of preparing and sending an email to another person by using an online email application has a stronger correlation with a cyber-context than a physical context, while there is a modest correlation with a social context, for example. In contrast, a task of having a meal alone has a strong correlation with a physical context and no correlation with a cyber context or a social context.

In some aspects, data transmission from sensors (110, 112, 114, and 116) to task manager 102 may take place in real time as the respective sensors collect task and activity data. Additionally or alternatively, the sensors (110, 112, 114, and 116) may transmit the task and activity data in a batch basis. The task receiver 120 may also poll the sensors (110, 112, 114, and 116) periodically to request the task and activity data.

Task receiver 120 may receive activity data and context features from the cyber activity sensor 110, the physical activity sensor 112, the social activity sensor 114, and the user sensors 116 and store the task with its past and current context features in a task store 122. In some aspects, the task receiver 120 may comprise a task annotation receiver 120A. The task annotation receiver 120A receives annotations to tasks from users. Users may input include descriptions of their tasks from electronic devices and/or a computer. The annotations may be based on the Event Sampling Method (ESM), for example, through in-situ surveys sent to the users. Task identifier 120B identifies tasks based on the annotations and a combination of cyber-activity data, physical activity data, and social activity data, received from the respective sensors (110, 112, 114, and 116).

In some aspects, the combination of cyber activity data, the physical activity data, and the social activity data, are the CPS context features of tasks. Task store 122 with past/current contexts may store task and activity data for retrieval by task model generator 124 to generate/train CPS context models and to analyze the current tasks.

Task model generator 124 generates task models based on data that relate to tasks that have taken place in the past and contexts that are associated with the respective tasks. Task model generator 124 may receive tasks and context features from the task store 122 with past/current context features. In some aspects, the task model generator 124 generates a task model based on a combination of comparative degrees of involvement in various types of contexts within the CPS context. A task model for having a meal by himself/herself has a strong degree of involvement as a physical context while a minimal degree of involvement as a cyber-context or a social context, for example.

In some aspects, a task model based on a CPS context may be represented by CPS vector, which may be an aggregated multi-dimensional vector, where each dimension represents contexts: cyber, physical, and social contexts. A multi-dimensional vector representation of a task of having a meal alone would be (0, 10, 0), for example, when the value zero represents the weakest correlation with the specific context and the value ten being the strongest, and the expression of multi-dimensional vector values is in a format (Cyber, Physical, Social). Accordingly, a task model of a task of having a face to face meeting to jointly draft a document through discussions may be represented as (5, 10, 10).

The representation of a task model is not limited to the aforementioned format. Other representations based on multi-dimensional vectors may be used to generate and maintain a task model based on a CPS context to serve the same or similar purposes. CPS task models may be used as a classifier to classify tasks.

Task scheduler 128 schedules tasks. In some aspects, the task scheduler 128 receives a current task with the current CPS context and re-schedules the task by grouping the task with another task based on the CPS context to improve efficiency of performing the respective tasks.

In some other aspects, the task schedule 128 receives a future task with a CPS context from the future task store with prospective contexts (queue) 130 and schedules the task based on the CPS context models by grouping the future tasks with other tasks with a similar CPS context according to a particular CPS context model. A "future task" is any task that has not yet been completed and comprises one or more of the following: a task class, a task description, a user who is to perform the task, a start time, end time, and a CPS context (such as a CPS vector). In some aspects, the future task store 130 represents a task queue of tasks to be scheduled and/or a backlog of tasks that need to be completed. Tasks that require a same physical location may be grouped together so that these tasks can be performed when the user is at the particular physical location, for example. Additionally or alternatively a user may create and store a future task and store in the future task store by using an application such as a calendar application.

As should be appreciated, the various methods, devices, applications, features, etc., described with respect to FIG. 1 is not intended to limit the system 100 to being performed by the particular applications and features described. Accordingly, additional controller configurations may be used to practice the methods and systems herein and/or features and applications described may be excluded without departing from the methods and systems disclosed herein.

Figure 2:
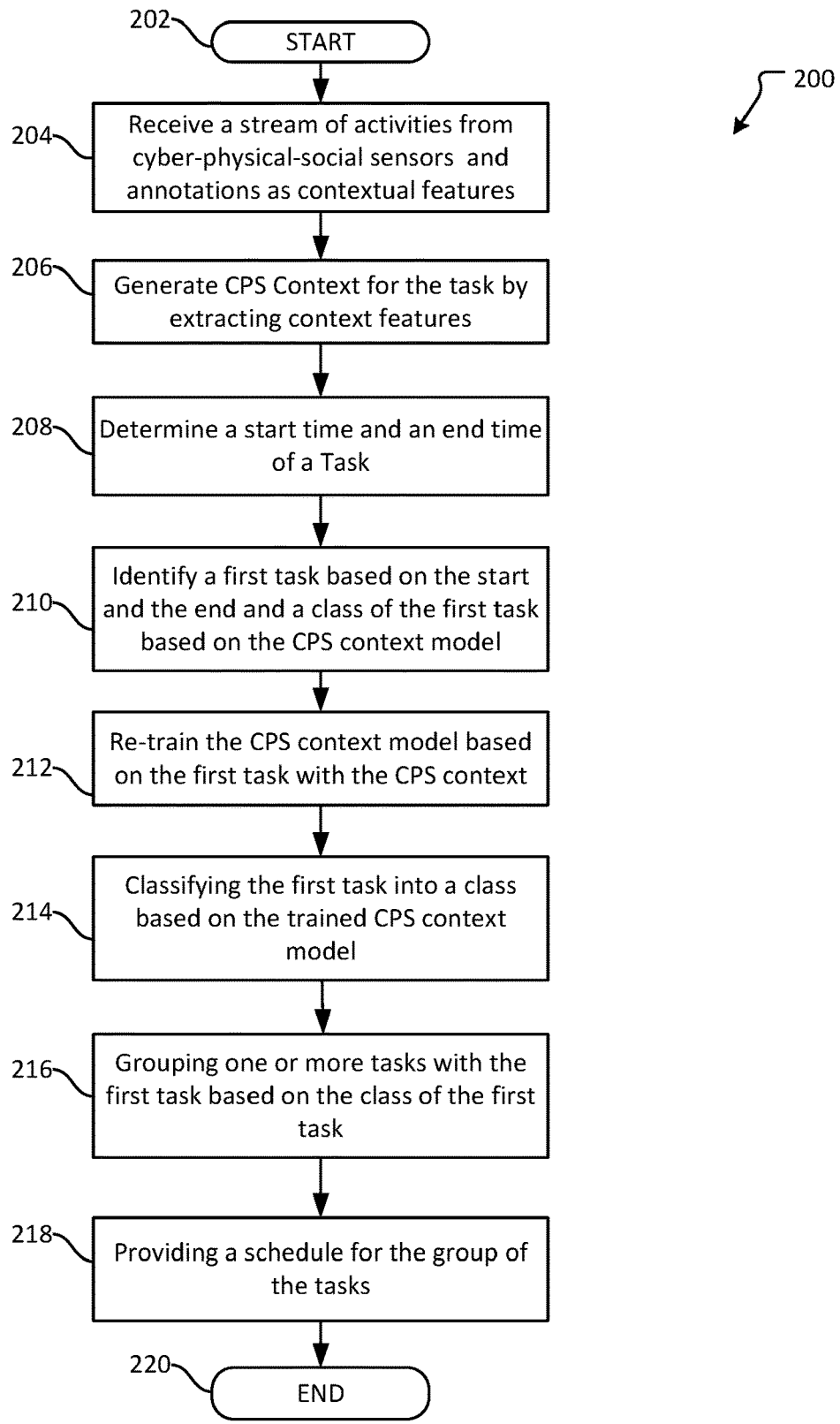
FIG. 2 illustrates an example method of grouping tasks based on a CPS context according to an example system with which the disclosure may be practiced in accordance with aspects of the present disclosure.

FIG. 2 illustrates an example method of generating a CPS context, identifying (210) a task, and re-training (212) a CPS context model based on the CPS context of the task in accordance with aspects of the present disclosure.

A general order for the operations of the method 200 is shown in FIG. 2. Generally, the method 200 starts with a start operation 202 and ends with an end operation 218. The method 200 may include more or fewer steps or may arrange the order of the steps differently than those shown in FIG. 2. The method 200 can be executed as a set of computer-executable instructions executed by a computer system and encoded or stored on a computer readable medium. Further, the method 200 can be performed by gates or circuits associated with a processor, an ASIC, an FPGA, a SOC or other hardware device. Hereinafter, the method 200 shall be explained with reference to the systems, component, devices, modules, software, data structures, data characteristic representations, signaling diagrams, methods, etc. described in conjunction with FIGS. 1, 3, 4A-B, 5, 6, 7, and 8A-B. The method 200 presumes that there is a CPS context model that has been generated and trained. In some aspects, the CPS context model may be generated based on sample tasks that have been classified into task classes. The generated CPS context model may be retrained based on tasks that are identified based on the start time, the end time, activity data, and the annotations made by the user.

Receive operation 204 receives a stream of activities and context features from cyber-physical-social sensors. In some aspects, cyber activities may include, but are not limited to, emailing, writing documents using electronic devices, web browsing, social networking, and entertainment games, for example. Physical activities may include, but are not limited to the physical activities of users in a spatio-temporal domain. The physical activities may be captured through the readings of accelerometer, gyroscope, magnetometer sensors, transport mode, and semantic labels of locations that the user has visited (e.g., home, office, a meeting room, and train stations). Social activities may relate to social interactions of the user, including direct interactions and meetings with other people. In some aspects, social activities may be captured through the presence of WiFi/Bluetooth access points, the surrounding noise levels, and in-situ annotations which characterize types of environment and degree of social encounters with other people.

The stream of activities may also include annotations input by the user in response to questions provided by the system. A question may be "what kind of task did you engage in between 10:00 AM and 11:10 AM, that you spent most of your time on?" for example. The user may respond by specifying one or more of task classes. Classes of a task may include, but are not limited to, communication, documentation, administration and management, planning, education, IT (software- or hardware-related tasks), finance, physical, problem solving, low-level data entry, project reporting, customer care, meals and breaks, and travel. The query and response processing for the annotations may be based on Experiment Sampling Method (ESM) through in-situ surveys, triggered by notifications through an app to the user on electronic devices, for example. In some other aspects classes of a task may comprise: work-related tasks (covering different types of jobs that a user may have), personal tasks (personal organization, reflection or care, commuting, cleaning and house improvement, for example), social-exercise-entertainment tasks (social events, exercise and relaxation), caring tasks (caring household or non-household members), and civil obligations (voting and signing petitions).

Generate operation 206 generates a CPS context for the task by extracting CPS context features. In some aspects, the CPS context may be a CPS feature set (Cyber feature, Physical context feature, Social context feature). The CPS context may be represented as a multi-vector value, each vector representing a magnitude of each context feature, for example. As discussed earlier, the magnitude may be zero. In some other aspects, additional CPS contexts may be determined at various times of user's activities to determine change of contexts.

Determine operation 208 determines a start and an end of performing a task based on the generated CPS context. In some aspects, the start and the end (or a boundary) of a task may be determined based on a combination of the generated CPS context and the in-situ annotations and changes of CPS context features over time. In some other aspects, the end time of the task may be estimated by identifying tasks with the same CPS context as the task and CPS activities of the user performing the identified tasks.

Identify operation 210 identifies a first task based on the determined start and end of the first task. The first task may comprise a task description, a user who has performed the task, an annotation received from the user, CPS context features based on the activity log, a start time, and end time. In some aspects, the first task and its CPS context may be stored in the task store with context features 122, for example.

Classifying operation 214 classifies the first task into a class based on a trained CPS context model. Through the classifying operation 214, a class of the first task is determined.

The CPS context model is trained to classify tasks. Training the CPS context model may include building a set of classes through machine learning, for example. The learning process may include training, testing, and internal evaluation processes. Classes may be based on Support Vector Machine (SVM), Naïve Bayes, k-Nearest Neighbor (k-NN), Logistic Regression Classifier with Restricted Bolzmann Machine feature extractor, denoted as LRC (RBM), a Decision Tree, and Random Forests. In some aspects, these classes are instantiated using the scikit-learn machine learning tools implemented using Python, for example.

To build a Decision Tree classifier, information gain (entropy function) may be used in the tree splitting process. For building a classifier based on the SVM algorithm, a tolerance parameter of 0.001, for example, may be used with a radial basis function (RBF) kernel. For naïve Bayes classifier, a machine model to perform effective non-linear feature extraction from CPS feature sets with a learning rate of 0.06, for example, 100 hidden units, and 20 iterations. For k-Nearest Neighbor (k-NN) class, a setting of k=5, for example, may be used. The CPS context model may be specific to the user. Additionally or alternatively, the CPS context model may be common across all users.

Classes of a task may be include, but are not limited to, communication, documentation, administration and management, planning, education, IT (software- or hardware-related tasks), finance, physical, problem solving, low-level data entry, project reporting, customer care, meals and breaks, and travel. See Table 1 below.

TABLE 1

| Class of Task | Description |
| --- | --- |
| Communication | Tasks related to individuals exchanging information directly, either synchronously or via an online meeting platform. For example, the emailing section of the communication category consists of many subgroups which can be divided into the action people are taking, such as replying, reading, sending, checking, and deleting. |
| Documentation | Tasks related to creating or revising written documents. Types of documents include periodically published documents, annual, weekly, for example. Activities upon documents include typing, designing, or editing. In some aspects, emailing is not in this class since the primary purpose of email message creation is generally communication. |
| Administration and Management | Tasks to operate a workplace: recruitment and staff inductions, management of people, management of files including printing, copying or scanning a document, and general paperwork. |
| Planning | Tasks which are related to preparing, engineering, planning, or booking items such as arranging events, meeting preparation, booking travel, etc. Some of these tasks include immediate and precise planning such as arranging a meeting with an international clients or created plan and agenda for an upcoming meeting with participants in person and via video calls as well as broader future planning such as monthly planning. |
| Education | Tasks in two major subgroups: teaching and learning. Common examples of the first subgroup include teaching a class or training new employees. Examples of the second subgroup include undertaking a training course or attending training. A third minor subgroup is marking work, which is mostly undertaken in an educational setting such as grading assessments, papers, or exams. |
| IT (software - hardware-related tasks) | Software- or hardware-related tasks. Software-related tasks include maintaining websites, writing and designing software, or setting up databases. The hardware-related tasks include fixing computers or printers, for example. |
| Finance | Tasks that relate to monitoring and recording expenditures, bookkeeping tasks on tax, bills, and payroll, budgeting, and invoicing, for example. |
| Physical | Comprises three subgroups: cleaning, sporting activities and physical labor, for example. These tasks require physical activity in order to complete the tasks. |
| Problem-solving | Associated with people who carry out research: e.g. conduct, collate, or analyze input, which includes searching and researching. |
| Low-level data entry | Gathering, collection, or importing. The low-level class also includes tasks related to spreadsheets such as creating, filling out, or updating a spreadsheet. |
| Projects | Updating project statuses, explicitly mentioning making progress or working on a project such as collaborating, completing, or finalizing a project. Customer care relates to helping clients or customers (patients are considered customers in this setting). Responses include dealing with, serving, or taking care of customers. |
| Meals and Breaks | Two major subgroups: one related to sustenance and one describing the act of pausing. Examples of the first subgroup include: breakfast, eating lunch, or making a meal. Such responses were often seen as a break in a work setting. Examples of the second subgroup include having a break and having a meditation. . |
| Travel | Tasks related to transit such as flying to a client, driving to an interview, or transporting goods, and are all classified as travel. |
| Invalid | The "invalid" class includes explicitly indicating that no task was completed for a particular time length: work-in-progress, tasks without specific annotations (e.g., "desk job work") or not applicable as tasks. |

Grouping operation 216 groups one or more tasks with the first task to generate a group of tasks that share CPS contexts that are in common or related. In some aspects, the group of tasks may share a CPS context of being at the same location. In some other aspects, the group of tasks may share a CPS context of having the same ambience of a location such as a required level of brightness and noise, for example. Certain tasks, a task of reading, for example, may require a bright light and a quiet place. Yet in some other aspects, the group of tasks may share a CPS context where tasks need to be performed with a specific colleague, for example. Accordingly, the operation 216 retrieves a group of tasks where an efficiency of time used by users may improve by performing in a batch the tasks with requirements that are in common, meeting with people when they are located at a same location at a same time, for example. In some aspects, multiple tasks that share the same class of tasks, emailing, for example, may be grouped together to perform in a batch. By grouping tasks based on classes enables efficiency of performing the tasks because like tasks are performed in conjunction with one another. All tasks that require emailing may be grouped together for the user to perform the emailing task when the user is at a computer, for example.

Provide operation 218 provides the group of tasks that includes the first task. In some aspects, the schedule of the updated group of tasks may be provided to the user and calendar applications, for example. In some other aspects, a notification may be transmitted to the user with the updated group of tasks to be performed. The notification may be received by an electronic device and/or a computer that the user uses, causing the notification to be displayed and/or processed as a sound notification.

As should be appreciated, operations 202-220 are described for purposes of illustrating the present methods and systems and are not intended to limit the disclosure to a particular sequence of steps, e.g., steps may be performed in different order, an additional steps may be performed, and disclosed steps may be excluded without departing from the present disclosure.

Figure 3:
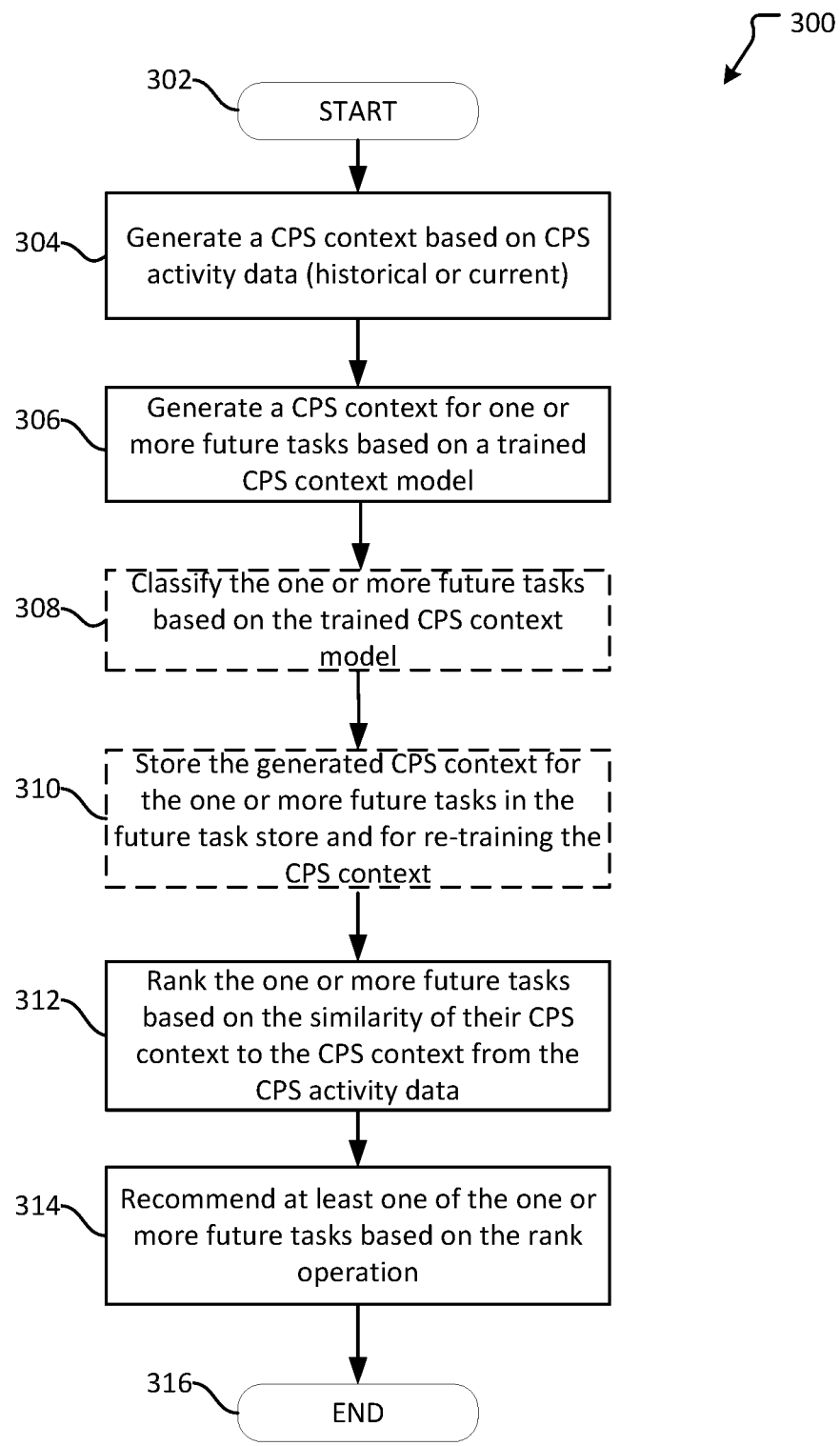
FIG. 3 illustrates an example method of grouping tasks based on a CPS context according to an example system with which the disclosure may be practiced in accordance with aspects of the present disclosure.

FIG. 3 illustrates an example method of scheduling tasks based on a CPS context in accordance with aspects of the present disclosure.

A general order for the operations of the method 300 is shown in FIG. 3. Generally, the method 300 starts with a start operation 302 and ends with an end operation 316. The method 300 may include more or fewer steps or may arrange the order of the steps differently than those shown in FIG. 3. The method 300 can be executed as a set of computer-executable instructions executed by a computer system and encoded or stored on a computer readable medium. Further, the method 300 can be performed by gates or circuits associated with a processor, an ASIC, an FPGA, a SOC or other hardware device. Hereinafter, the method 300 shall be explained with reference to the systems, component, devices, modules, software, data structures, data characteristic representations, signaling diagrams, methods, etc. described in conjunction with FIGS. 1, 2, 4A-B, 5, 6, 7, and 8A-B.

Generate operation 304 generates a CPS context based on CPS activity data (historical or current) that may be received from CPS sensors. In some aspects, the CPS context may be a current CPS context based on a current set of CPS activity data. The task scheduler 128 in the task manager 102 may generate a CPS context of a current activity of a user based on CPS activity data received from a combination of one or more of the cyber activity sensors 110, the physical activity sensors 112, the social activity sensors 114, and the user sensors 116. Additionally or alternatively, the CPS context may be a historical CPS context of a past activity that has taken place by any number of users. The task scheduler in the task manager 102 may generate the CPS context of a past activity of a user or multiple users based on CPS activity data that are stored in the task store with context features 122, for example. In some aspects, the CPS context may be represented as a CPS vector in a multi-vector expression based on multiple dimensions for a cyber context feature, a physical context feature, and a social context feature respectively.

Generate operation 306 generates a CPS context for one or more future tasks of a user based on a trained CPS context model. In some aspects, the future task(s) may belong to a user other than the user(s) from which the CPS activity data used to generate the CPS context originated. In some aspects, the task scheduler 128 may generate a CPS context based on a prospective CPS context retrieved from the one or more future task store with prospective contexts 130. In some aspects, a CPS context for a task may be represented as a CPS vector in a multi-vector expression based on multiple dimensions for a cyber context feature, a physical context feature, and a social context feature respectively. The CPS vector may be represented by a set of multiple vectors of cyber, physical, and social contexts (10, 0, 0), for example. The CPS vector may comprise additional sub-vectors that represent detailed contexts within the CPS context, a sub-vector of a cyber-vector representing a magnitude of using an email application on a computer in the user's cyber activity, for example. In some other aspects, generate operation 306 generates more than one CPS context for the respective future tasks. Subsequent operations of classifying the one or more future tasks may use the more than one CPS contexts respectively to classify, rank, and schedule the at least one of the one or more future tasks.

Classify operation 308 is optional as designated by the dashed lines. Operation 308 classifies the one or more future tasks based on the trained CPS context model. In some aspects, the classifying operation classifies the one or more future tasks by using the generated CPS context for the one or more future tasks. It applies the trained CPS context model retrieved from the CPS context store 126 and determines at least one class for the one or more future tasks. The CPS context model is trained to classify tasks.

Training the CPS context model may include building a set of classes through machine learning, for example. The learning process may include training, testing, and internal evaluation processes. Classes may be based on Support Vector Machine (SVM), Naïve Bayes, k-Nearest Neighbor (k-NN), Logistic Regression Classifier with Restricted Bolzmann Machine feature extractor, denoted as LRC (RBM), a Decision Tree, and Random Forests. In some aspects, these classes are instantiated using the scikit-learn machine learning tools implemented using Python, for example. Classes of a task may be include, but are not limited to, communication, documentation, administration and management, planning, education, IT (software- or hardware-related tasks), finance, physical, problem solving, low-level data entry, project reporting, customer care, meals and breaks, and travel. See Table 1.

Optional store operation 310 stores the generated CPS context for the one or more future tasks in the future task store 130. These newly stored CPS contexts may be used to update training or for re-training the CPS context model. Additionally or alternatively, the store operation 310 may provide information about the generated task to the task model generator 124 to re-train the CPS context model. (Not shown in FIG. 3). Through re-training the CPS context model, the task manager improves accuracy and efficiency of determining a class to a CPS context.

Rank operation 312 ranks the one or more future tasks based on the similarity of the generated CPS context for the one or more future tasks to the CPS context based on the CPS activity data (historical or current). In some aspects, the similarity is based on the degree of a match by comparing the CPS vector for the one or more future tasks with the CPS vector of the CPS context based on the CPS activity data. In aspects, the more similar the vectors are, the higher the rank they will receive. Similarity is measured using standard similarity metrics such as cosine similarity or feature reductions within the cyber vector representation, physical vector representation, social vector representation such as with KL divergence or entropy. In aspects, magnitudes of respective dimensions of each of the multi-dimensional CPS vectors are compared to measure a "distance" of the CPS vectors in the multi-dimensional coordinate system. For example, the CPS activity data might have a CPS vector representation of (3, 8, 8). If there are two future tasks, each will be represented as a multi-dimensional CPS vector such that there is a first future CPS vector and a second future CPS vector. Using the above example, the first future task might be having meal alone with a CPS vector representation of (0, 10, 0). The second future task might be a face to face meeting to jointly draft a document through discussions that is represented as (5, 10, 10). The first and second future tasks may be stored in the queue 130. The first future task CPS vector (0, 10, 0) is compared to the CPS activity vector (3, 8, 0) to measure the distance between the two. The second future task CPS vector (5, 10, 10) is compared to the CPS activity vector (3, 8, 8) to measure the distance between the two. Then the two distances are ranked such that the smaller the computed distance the more similar the CPS activity data is to the future task. In this example, the second future task has a smaller distance/higher similarity to the CPS activity data than the first future task. As such, the second future task would be ranked first and the first future task would be ranked second. In other aspects, the vector representations for cyber, physical, and social may be given different weights in the multi-dimensional vector representation. For example, if social was weighted much more heavily than cyber or physical, the ranking result might be different in the above example. That is, because the first future task and the CPS activity data both have a social vector representation of 0, the first task may have a smaller distance/higher similarity than the second task.

Additionally or alternatively, the rank operation 312 ranks the CPS context higher for the one or more future tasks if are classified in a common class. The activity as represented by the CPS context based on the CPS activity data may be grouped together with a highly ranked task of the one or more future tasks as they are similar in terms of CPS contexts.

Recommend operation 314 recommends at least one of the one or more future tasks based on the rank operation. In some aspects, the task scheduler 128 generates one or more new task items in the task manager 102 and schedules the new tasks for the user to perform. The task scheduler 128 may store the newly scheduled task in the future task store with prospective contexts 130. In some other aspects, the task scheduler 128 generates one or more appointments that relate to the at least one of the one or more future tasks in a calendar system (not shown). The CPS context for the at least one of the one or more future tasks may recommend a time, a location, a description of the task, and other requirements to perform the task in terms of the cyber activity, the physical activity, and the social activity. As a result of the series of the operations, future tasks may be recommended to be performed with future tasks that have similar CPS contexts to increase efficiency and effectiveness of performing the respective tasks.

As should be appreciated, operations 302-316 are described for purposes of illustrating the present methods and systems and are not intended to limit the disclosure to a particular sequence of steps, e.g., steps may be performed in different order, an additional steps may be performed, and disclosed steps may be excluded without departing from the present disclosure.

FIGS. 4A-B illustrate examples of scheduling tasks by grouping the tasks based on CPS Context according to an example system in accordance with aspects of the present disclosure.

The table 400A in FIG. 4A illustrates an example of tasks with information associated with the respective tasks. Task ID 0001 is a task that is currently performed by user A for a time duration of 15 (minutes) without requiring a specific location, for example. The task ID 0001 has a description "Send Email to B." The task has a cyber-physical social (CPS) context value of (10, 0, 5). Task ID 0002 is a task to be performed by user A for a time duration of 30 minutes, without requiring a specific location, to "write a memo about a topic Y using an application program on a computer"; the task has a CPS context value of (10, 0, 0). Here the task 002 is a cyber (online) activity to write a memo about a topic Y thus with a high level of cyber-context, no a physical context, and no social context. In some aspects, a task that involves use of an electronic device and/or a computer has a cyber context, regardless of whether the user types or dictates to generate a memo, for example. Task ID 0003 is to be performed by user B for a time duration of 15 minutes, without requiring a specific location to perform a task "travel to office"; the task has a CPS context value (0, 10, 0). Task 0004 is to be performed by user A for a time duration of 60 minutes at a location Room X to meet with B and C; the task has a CPS context value (0, 10, 10). Here, the task has a zero cyber-context, a high physical context and a high social context because it is a face-to-face meeting among people. Similarly to task 0004, task 0005 is to be performed by user C for a time duration of 60 minutes at a location Room X to meet with A and B; it has a CPS context value (0, 10, 10). Task 0006 is to be performed by user D for a time duration for 15 minutes, without requiring a specific location, to consult with A and B; the task has a CPS context value (0, 10, 10) as it is a face-to-face meeting without online activities. Task 0007 is to be performed by user A for a time duration of 20 minutes, without requiring a specific location to search about a topic Y on the web; the task has a CPS context value (10, 0, 0) as it is an online web search activity.

The table 400B in FIG. 4B illustrates tasks from FIG. 4A with information associated with the respective tasks after grouping or generating clusters of tasks based on CPS context models for classes of the tasks. In particular, tasks with task ID 0001, 0002, and 0007 are grouped together into the same cluster (group ID=1) because the three tasks are classified as a high level of cyber context because these tasks relate to sending emails, writing a memo, and doing a web search. Tasks with task ID 0004, 0005, and 0006 are grouped together into the same cluster (group ID=2) because these three tasks closely relate to a physical activity of having face-to-face meetings. Based on the clustering of the tasks in group 2, task 0006 has been revised to require a specific location of Room X, the same place that A and B are meeting with C. In some aspects, clustering of tasks may be based on CPS contexts that specify the same physical location and at the same time when the tasks have the same class of a face-to-face meeting based on a CPS context model.

FIG. 5 illustrates an example method of grouping tasks based on a CPS context according to an example system in accordance with aspects of the present disclosure.

A general order for the operations of the method 500 is shown in FIG. 5. Generally, the method 500 starts with a start operation 502 and ends with an end operation 516. The method 500 may include more or fewer steps or may arrange the order of the steps differently than those shown in FIG. 5. The method 500 can be executed as a set of computer-executable instructions executed by a computer system and encoded or stored on a computer readable medium. Further, the method 500 can be performed by gates or circuits associated with a processor, an ASIC, an FPGA, a SOC or other hardware device. Hereinafter, the method 500 shall be explained with reference to the systems, component, devices, modules, software, data structures, data characteristic representations, signaling diagrams, methods, etc. described in conjunction with FIGS. 1, 2, 3, 4A-B, 6, 7, and 8A-B.

The receive operation 504 may receive a first task. The first task may be received from the task store with past/current contexts 122. In some aspects, the first task may be "to prepare and send an email to a recipient A regarding a topic X", for example.

The generate operation 506 generates a CPS context of the first task based on data from the task store with past/current contexts 122. The CPS context for the first task may be retrieved from the task store 122. Additionally or alternatively, the CPS context may be received from activity sensors. The CPS context may be represented as a combination of a cyber context feature, a physical context feature, and a social context feature (Cyber, Physical, Social)=(10, 0, 2), for example, indicating that the task has a high score (10) in terms of a cyber context feature value, a low score (0) in terms of a physical context feature, and a relatively low score (2) in terms of a social context feature.

The receive operation 508 receives a CPS context model based on the CPS context of the first task. In some aspects, the CPS context model represents a classifier of tasks. A class of the first task based on its CPS context may be "sending an email," for example.

The identify operation 510 identifies a second task based on the received CPS context model. The second task, being distinct from the first task, is a task yet to be performed by the user. The second task may be "to send an email to B on a topic Y," for example, with a class as "sending an email," for example. The second task may be identified from a set of tasks stored in the future task store with prospective contexts (queue) 130. By having the same class of "sending an email" as the first task, the identify operation 210 may identify the second task "to send an email to B on a topic Y" by inferring that the user would use the same email application being used for the first task to perform the second task and thus improving productivity and efficiency of task performance by grouping the first task ("to send an email to Z on a topic X") and the second task, so that the user can perform the first task and then proceed with performing the second task.

The revise operation 512 revises the second task to be performed in conjunction with the first task. In some aspects, the revise operation 512 revises task attributes, time and location, for example. Accordingly the update operation 514 updates a task queue based on the second task for the user to perform the second task following the first task, using the same email application.

As should be appreciated, operations 502-516 are described for purposes of illustrating the present methods and systems and are not intended to limit the disclosure to a particular sequence of steps, e.g., steps may be performed in different order, an additional steps may be performed, and disclosed steps may be excluded without departing from the present disclosure.

FIG. 6 illustrates a schematic example of generating and training a CPS context model according to an example system 600 in accordance with aspects of the present disclosure.

Cyber activity sensor 602 senses cyber (online) activities, emailing, video messaging, online documentation, social networking for example. The cyber activity sensor 602 provides activity data to a CPS feature extractor: cyber features 604. The CPS feature extractor: cyber features 604 extracts cyber features based on the received cyber activity data. Cyber features may include binary features of uncategorized, social network, utilities, communication, scheduling, online shopping, software development, for example. In some aspects, cyber features may include smartphone app usage patterns, categories of visited web domains by the user, and application usage on the smartphone or other electronic devices. The extracted cyber features are sent to task identifier 630.

Physical activity sensor 606 senses physical activities such as having a face-to-face meeting, moving, resting, having a meal, for example. The physical activity sensor 606 provides activity data to a CPS feature extractor: physical features 608. The CPS feature extractor: physical features 608 extracts physical features based on the received physical activity data. Physical features may include statistical features from time periods based on a sliding window model on magnitudes of accelerometer, gyroscope, and magnetometer readings, for example. In some aspects, physical features may include a user's physical movement locations and its semantics labels, and mobility-related data based on readings from the accelerometer, gyroscope and magnetometer signals of the user's smartphone or wearable device, transportation mode, change of location clusters, and transportation hotspots. In some other aspects, the physical features may include environmental signals of a location: a temperature, brightness, and a noise level, for example. The extracted physical features are provided to the task identifier 630.

Social activity sensor 610 senses social activities among users. The social activity sensor 610 provides social activity data to a CPS feature extractor: social features 612. The CPS feature extractor: social features 612 extracts social features based on the received social activity data. Social features may include binary feature based on digital information of direct interaction with other users for a progression of a task and statistical features from the sliding window model on noise level surrounding the user. The sliding window may be with a window size of 300 seconds and 50% overlap, for example, to normalize magnitudes of readings from sensors using min-max normalization. In some aspects, social features may also include the user's ambient sensing environment, social profiles and interactions with other users, indication of proximity to other users or sensing devices, a number of users involved in completing the task. The extracted social features are provided to the task identifier 630.

The task identifier 630 receives respective features along with task annotations 614 to recognize a task. In some aspects, the task identifier 630 uses different weight values (weight WC 616 for cyber features, WP 618 for physical features, and WS 620 for social features) to identify a task. Magnitudes of the respective weights may be based on respective tasks. In some other aspects, the task identifier 630 may determine a boundary construction of the task based on physical data (e.g., time) and the task annotations (e.g. in-situ annotation by the user about tasks being performed).

CPS context modeler and trainer 640 generates and trains CPS context model based on CPS context features about tasks. In some aspects, the CPS context modeling may be applied to any of the CPS context feature sets. CPS context models may be used as an intelligent task classifier to classify a task with its CPS task features. In some aspects, cyber context features and social context features may contribute most to the activities of communication and travel, for example.

As should be appreciated, the various methods, devices, applications, features, etc., described with respect to FIG. 6 is not intended to limit the system 600 to being performed by the particular applications and features described. Accordingly, additional controller configurations may be used to practice the methods and systems herein and/or features and applications described may be excluded without departing from the methods and systems disclosed herein.

FIG. 7 is a block diagram illustrating physical components (e.g., hardware) of a computing device 700 with which aspects of the disclosure may be practiced. The computing device components described below may be suitable for the computing devices described above. In a basic configuration, the computing device 700 may include at least one processing unit 702 and a system memory 704. Depending on the configuration and type of computing device, the system memory 704 may comprise, but is not limited to, volatile storage (e.g., random access memory), non-volatile storage (e.g., read-only memory), flash memory, or any combination of such memories. The system memory 704 may include an operating system 705 and one or more program tools 706 suitable for performing the various aspects disclosed herein such. The operating system 705, for example, may be suitable for controlling the operation of the computing device 700. Furthermore, aspects of the disclosure may be practiced in conjunction with a graphics library, other operating systems, or any other application program and is not limited to any particular application or system. This basic configuration is illustrated in FIG. 7 by those components within a dashed line 708. The computing device 700 may have additional features or functionality. For example, the computing device 700 may also include additional data storage devices (removable and/or non-removable) such as, for example, magnetic disks, optical disks, or tape. Such additional storage is illustrated in FIG. 7 by a removable storage device 709 and a non-removable storage device 710.

As stated above, a number of program tools and data files may be stored in the system memory 704. While executing on the processing unit 702, the program tools 706 (e.g., entity-activity relationship application 720) may perform processes including, but not limited to, the aspects, as described herein. The entity-activity relationship application 720 includes a task receiver 730, a task model generator 732, and a task scheduler 734, as described in more detail with regard to FIG. 1. Other program tools that may be used in accordance with aspects of the present disclosure may include electronic mail and contacts applications, word processing applications, spreadsheet applications, database applications, slide presentation applications, drawing or computer-aided application programs, etc.

Furthermore, aspects of the disclosure may be practiced in an electrical circuit comprising discrete electronic elements, packaged or integrated electronic chips containing logic gates, a circuit utilizing a microprocessor, or on a single chip containing electronic elements or microprocessors. For example, aspects of the disclosure may be practiced via a system-on-a-chip (SOC) where each or many of the components illustrated in FIG. 7 may be integrated onto a single integrated circuit. Such an SOC device may include one or more processing units, graphics units, communications units, system virtualization units and various application functionality all of which are integrated (or "burned") onto the chip substrate as a single integrated circuit. When operating via an SOC, the functionality, described herein, with respect to the capability of client to switch protocols may be operated via application-specific logic integrated with other components of the computing device 700 on the single integrated circuit (chip). Aspects of the disclosure may also be practiced using other technologies capable of performing logical operations such as, for example, AND, OR, and NOT, including but not limited to mechanical, optical, fluidic, and quantum technologies. In addition, aspects of the disclosure may be practiced within a general purpose computer or in any other circuits or systems.

The computing device 700 may also have one or more input device(s) 712, such as a keyboard, a mouse, a pen, a sound or voice input device, a touch or swipe input device, etc. The output device(s) 714 such as a display, speakers, a printer, etc. may also be included. The aforementioned devices are examples and others may be used. The computing device 700 may include one or more communication connections 716 allowing communications with other computing devices 750. Examples of suitable communication connections 716 include, but are not limited to, radio frequency (RF) transmitter, receiver, and/or transceiver circuitry; universal serial bus (USB), parallel, and/or serial ports.

The term computer readable media as used herein may include computer storage media. Computer storage media may include volatile and nonvolatile, removable and non-removable media implemented in any method or technology for storage of information, such as computer readable instructions, data structures, or program tools. The system memory 704, the removable storage device 709, and the non-removable storage device 710 are all computer storage media examples (e.g., memory storage). Computer storage media may include RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other article of manufacture which can be used to store information and which can be accessed by the computing device 700. Any such computer storage media may be part of the computing device 700. Computer storage media does not include a carrier wave or other propagated or modulated data signal.

Communication media may be embodied by computer readable instructions, data structures, program tools, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media.

FIGS. 8A and 8B illustrate a computing device or mobile computing device 800, for example, a mobile telephone, a smart phone, wearable computer (such as a smart watch), a tablet computer, a laptop computer, and the like, with which aspects of the disclosure may be practiced. In some aspects, the client (e.g., computing systems 105 in FIG. 1) may be a mobile computing device. With reference to FIG. 8A, one aspect of a mobile computing device 800 for implementing the aspects is illustrated. In a basic configuration, the mobile computing device 800 is a handheld computer having both input elements and output elements. The mobile computing device 800 typically includes a display 805 and one or more input buttons 810 that allow the user to enter information into the mobile computing device 800. The display 805 of the mobile computing device 800 may also function as an input device (e.g., a touch screen display). If included, an optional side input element 815 allows further user input. The side input element 815 may be a rotary switch, a button, or any other type of manual input element. In alternative aspects, mobile computing device 800 may incorporate more or less input elements. For example, the display 805 may not be a touch screen in some aspects. In yet another alternative aspect, the mobile computing device 800 is a portable phone system, such as a cellular phone. The mobile computing device 800 may also include an optional keypad 835. Optional keypad 835 may be a physical keypad or a "soft" keypad generated on the touch screen display. In various aspects, the output elements include the display 805 for showing a graphical user interface (GUI), a visual indicator 820 (e.g., a light emitting diode), and/or an audio transducer 825 (e.g., a speaker). In some aspects, the mobile computing device 800 incorporates a vibration transducer for providing the user with tactile feedback. In yet another aspect, the mobile computing device 800 incorporates input and/or output ports, such as an audio input (e.g., a microphone jack), an audio output (e.g., a headphone jack), and a video output (e.g., a HDMI port) for sending signals to or receiving signals from an external device.

FIG. 8B is a block diagram illustrating the architecture of one aspect of computing device, a server (e.g., server 109 or server 104), a mobile computing device, etc. That is, the computing device 800 can incorporate a system (e.g., an architecture) 802 to implement some aspects. The system 802 can implemented as a "smart phone" capable of running one or more applications (e.g., browser, e-mail, calendaring, contact managers, messaging clients, games, and media clients/players). In some aspects, the system 802 is integrated as a computing device, such as an integrated digital assistant (PDA) and wireless phone.

One or more application programs 866 may be loaded into the memory 862 and run on or in association with the operating system 864. Examples of the application programs include phone dialer programs, e-mail programs, information management (PIM) programs, word processing programs, spreadsheet programs, Internet browser programs, messaging programs, and so forth. The system 802 also includes a non-volatile storage area 869 within the memory 862. The non-volatile storage area 869 may be used to store persistent information that should not be lost if the system 802 is powered down. The application programs 866 may use and store information in the non-volatile storage area 869, such as e-mail or other messages used by an e-mail application, and the like. A synchronization application (not shown) also resides on the system 802 and is programmed to interact with a corresponding synchronization application resident on a host computer to keep the information stored in the non-volatile storage area 869 synchronized with corresponding information stored at the host computer. As should be appreciated, other applications may be loaded into the memory 862 and run on the mobile computing device 800 described herein.

The system 802 has a power supply 870, which may be implemented as one or more batteries. The power supply 870 might further include an external power source, such as an AC adapter or a powered docking cradle that supplements or recharges the batteries.

The system 802 may also include a radio interface layer 872 that performs the function of transmitting and receiving radio frequency communications. The radio interface layer 872 facilitates wireless connectivity between the system 802 and the "outside world," via a communications carrier or service provider. Transmissions to and from the radio interface layer 872 are conducted under control of the operating system 864. In other words, communications received by the radio interface layer 872 may be disseminated to the application programs 866 via the operating system 864, and vice versa.

The visual indicator 820 may be used to provide visual notifications, and/or an audio interface 874 may be used for producing audible notifications via the audio transducer 825. In the illustrated configuration, the visual indicator 820 is a light emitting diode (LED) and the audio transducer 825 is a speaker. These devices may be directly coupled to the power supply 870 so that when activated, they remain on for a duration dictated by the notification mechanism even though the processor 860 and other components might shut down for conserving battery power. The LED may be programmed to remain on indefinitely until the user takes action to indicate the powered-on status of the device. The audio interface 874 is used to provide audible signals to and receive audible signals from the user. For example, in addition to being coupled to the audio transducer 825, the audio interface 874 may also be coupled to a microphone to receive audible input, such as to facilitate a telephone conversation. In accordance with aspects of the present disclosure, the microphone may also serve as an audio sensor to facilitate control of notifications, as will be described below. The system 802 may further include a video interface 876 that enables an operation of an on-board camera 830 to record still images, video stream, and the like.

A mobile computing device 800 implementing the system 802 may have additional features or functionality. For example, the mobile computing device 800 may also include additional data storage devices (removable and/or non-removable) such as, magnetic disks, optical disks, or tape. Such additional storage is illustrated in FIG. 8B by the non-volatile storage area 868.

Data/information generated or captured by the mobile computing device 800 and stored via the system 802 may be stored locally on the mobile computing device 800, as described above, or the data may be stored on any number of storage media that may be accessed by the device via the radio interface layer 872 or via a wired connection between the mobile computing device 800 and a separate computing device associated with the mobile computing device 800, for example, a server computer in a distributed computing network, such as the Internet. As should be appreciated such data/information may be accessed via the mobile computing device 800 via the radio interface layer 872 or via a distributed computing network. Similarly, such data/information may be readily transferred between computing devices for storage and use according to well-known data/information transfer and storage means, including electronic mail and collaborative data/information sharing systems.

Although the present disclosure describes components and functions implemented with reference to particular standards and protocols, the disclosure is not limited to such standards and protocols. Other similar standards and protocols not mentioned herein are in existence and are considered to be included in the present disclosure. Moreover, the standards and protocols mentioned herein and other similar standards and protocols not mentioned herein are periodically superseded by faster or more effective equivalents having essentially the same functions. Such replacement standards and protocols having the same functions are considered equivalents included in the present disclosure.

The present disclosure, in various configurations and aspects, includes components, methods, processes, systems and/or apparatus substantially as depicted and described herein, including various combinations, subcombinations, and subsets thereof. Those of skill in the art will understand how to make and use the systems and methods disclosed herein after understanding the present disclosure. The present disclosure, in various configurations and aspects, includes providing devices and processes in the absence of items not depicted and/or described herein or in various configurations or aspects hereof, including in the absence of such items as may have been used in previous devices or processes, e.g., for improving performance, achieving ease, and/or reducing cost of implementation.

Aspects of the present disclosure, for example, are described above with reference to block diagrams and/or operational illustrations of methods, systems, and computer program products according to aspects of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

The description and illustration of one or more aspects provided in this application are not intended to limit or restrict the scope of the disclosure as claimed in any way. The aspects, examples, and details provided in this application are considered sufficient to convey possession and enable others to make and use the best mode of claimed disclosure. The claimed disclosure should not be construed as being limited to any aspect, for example, or detail provided in this application. Regardless of whether shown and described in combination or separately, the various features (both structural and methodological) are intended to be selectively included or omitted to produce an embodiment with a particular set of features. Having been provided with the description and illustration of the present application, one skilled in the art may envision variations, modifications, and alternate aspects falling within the spirit of the broader aspects of the general inventive concept embodied in this application that do not depart from the broader scope of the claimed disclosure.

As will be understood from the foregoing disclosure, one aspect of the technology relates to a computer-implemented method of scheduling a task based on a cyber-physical-social (CPS) context. The method comprises generating a CPS context based on CPS activity data from CPS activity sensors, wherein the CPS activity data comprises one or more of a cyber context feature, a physical context feature, and a social context feature; generating a CPS context for one or more future tasks based on a trained CPS context model; ranking the one or more future tasks based on a similarity of the CPS context for the one or more future tasks with the CPS context based on the CPS activity data; and recommending at least one of the one or more future tasks based on the ranking of the one or more future tasks. In an example, the computer-implemented method further comprises receiving one or more annotations comprising in-situ annotations describing the CPS context based on the CPS activity data; and using the one or more annotations and the CPS context based on the CPS activity data to generate the CPS context for the one or more future tasks. In another example, the computer-implemented method further comprises determining a start time of the CPS activity data based at least in part on the generated CPS context; determining an end time of the CPS activity data based at least in part on the generated CPS context; and identifying a first task based at least on the start time and the end time. In an example, the computer-implemented method further comprises training the CPS context model using Support Vector Machine (SVM). The CPS context is based on historic CPS activity data from the CPS activity sensors. The generated CPS context for the one or more future tasks comprises a CPS vector. The one or more future tasks comprise a plurality of future tasks and the method further comprises scheduling the plurality of future tasks in batches based on the ranking of the plurality of future tasks. The CPS current context comprises vector magnitudes for each of the cyber context feature, the physical context feature, and the social context feature. In another example, the computer-implemented method further comprises generating the CPS context based on a weighed combination the one or more of the cyber context feature, the physical context feature, and the social context feature. In yet another example, the computer-implemented method further comprises classifying at least one of the one or more future tasks into a class based on the trained CPS context model; and storing the classified at least one of the one or more future tasks in the trained CPS context model.

In another aspect, a computer system for scheduling a group of tasks based on a cyber-physical-social (CPS) context model comprises a processor; and a memory operably coupled to the processor, wherein the memory stores computer executable instructions that, when executed, cause the processor to: generate a CPS context based on CPS activity data collected from CPS activity sensors, wherein the CPS activity data comprises one or more of a cyber context feature, a physical context feature, and a social context feature; identify a first task based on the generated CPS context and annotation data associated with the CPS context; classify the identified first task into a class based on a trained CPS context model; group one or more additional tasks with the identified first task to create a group of tasks based on the class of the identified first task and the trained CPS context model; and provide a schedule for the group of tasks. In an example, the computer system further comprises computer executable instructions that, when executed, cause the processor to: receive the annotation data from a user, wherein the annotation data comprises an in-situ annotation describing the CPS context. In another example, the computer system further comprises computer executable instructions that, when executed, cause the processor to: receive the annotation data from a user, wherein the annotation data comprises an in-situ annotation describing the CPS context. The computer system further comprises computer executable instructions that, when executed, cause the processor to: determine a start time of the identified task based at least on the generated CPS context and the annotation data from the user; and determine an end time of the identified task based at least on the generated CPS context, the annotation data from the user, and the CPS activity data of the user; and identify the first task based at least on the start time and the end time. The computer system further comprises computer executable instructions that, when executed, cause the processor to: train the CPS context model using Support Vector Machine (SVM). The group of tasks has a shared CPS context based on: a location, a time, and a person to collaborate with.

In another aspect, a computer-implemented method for scheduling a task for a user based on a cyber-physical-social (CPS) context comprises: receiving a first task, wherein the first task is being currently undertaken by the user; generating a first CPS context of the first task, wherein the first CPS context comprises a CPS context feature based on one or more of a cyber-activity, a physical activity, and a social activity; using a CPS context model to classify the first task with a first class; identifying a second task, wherein the second task relates to the first class; and scheduling the second task to be performed by the user in conjunction with the first task. The CPS context further comprises: a cyber-activity relating to at least an online operation of electronic devices; a physical activity relating to a physical movement of the user; and a social activity relating to a person-to-person interaction by the user. The second task comprises a date, a location, a time duration, and a description of the task. In an example, the computer-implemented method further comprises: revising a time and location of the second task to be performed in conjunction with the first task; and updating a task queue based on the revised second task. The first task and the second task share a CPS context based at least in part on a time and presence of a second user.

Any of the one or more above aspects in combination with any other of the one or more aspect. Any of the one or more aspects as described herein.

What is claimed is:

1. A computer-implemented method for scheduling a task based on a cyber-physical-social (CPS) context, the method comprising:
   receiving CPS activity data from CPS activity sensors, wherein the CPS activity data includes a combination of, in real time, a cyber activity, a physical activity, and a social activity;
   generating a first CPS context based on the CPS activity data from the CPS activity sensors, wherein the first CPS context comprises a combination of comparative degrees of involvement of the CPS activity data in one or more of a cyber context feature corresponding to the cyber activity, a physical context feature corresponding to the physical activity, and a social context feature corresponding to the social activity;
   generating a second CPS context associated with one or more future tasks based on a trained CPS context model, wherein the trained CPS context model generates the second CPS context representing comparative degrees of involvement by the one or more future tasks based on cyber context features, physical context features, and social context features;
   ranking the one or more future tasks based on a similarity in magnitudes of dimensions of a cyber vector representation corresponding to the cyber activity, a physical vector representation corresponding to the physical activity, and a social vector representation corresponding to the social activity associated with the first CPS context and the second CPS context;
   recommending at least one of the one or more future tasks based on the ranking of the one or more future tasks; and
   retraining the trained CPS context model based on the recommended at least one of the one or more future tasks.

2. The computer-implemented method of claim 1, further comprising:
   receiving one or more annotations comprising in-situ annotations describing the first CPS context based on the CPS activity data; and
   using the one or more annotations and the first CPS context based on the CPS activity data to generate the second CPS context for the one or more future tasks.

3. The computer-implemented method of claim 1, further comprising:
   determining a start time of the CPS activity data based at least in part on the generated first CPS context;
   determining an end time of the CPS activity data based at least in part on the generated first CPS context; and
   identifying a first task based at least on the start time and the end time.

4. The computer-implemented method of claim 1, further comprising:
   retraining the trained CPS context model using Support Vector Machine (SVM).

5. The computer-implemented method of claim 1, wherein the first CPS context is based on historic CPS activity data from the CPS activity sensors.

6. The computer-implemented method of claim 1, wherein the generated second CPS context for the one or more future tasks comprises a CPS vector.

7. The computer-implemented method of claim 1, wherein the one or more future tasks comprise a plurality of future tasks and the method further comprises scheduling the plurality of future tasks in batches based on the ranking of the plurality of future tasks.

8. The computer-implemented method of claim 1, wherein the first CPS context comprises vector magnitudes for each of the cyber context feature, the physical context feature, and the social context feature.

9. The computer-implemented method of claim 1, further comprising:
   generating the first CPS context based on a weighted combination of the one or more of the cyber context feature, the physical context feature, and the social context feature.

10. The computer-implemented method of claim 1, further comprising:
    classifying at least one of the one or more future tasks into a class based on the trained CPS context model; and
    storing the classified at least one of the one or more future tasks in the trained CPS context model.

11. A computer system for scheduling a group of tasks based on a cyber-physical-social (CPS) context model, the computer system comprising:
    a processor; and
    a memory operably coupled to the processor, wherein the memory stores computer executable instructions that, when executed, cause the processor to:
       receive CPS activity data from CPS activity sensors, wherein the CPS activity data includes a combination of, in real time, a cyber activity, a physical activity, and a social activity;
       generate a first CPS context based on the CPS activity data collected from the CPS activity sensors, wherein the first CPS context comprises a combination of comparative degrees of involvement of the CPS activity data in one or more of a cyber context feature corresponding to the cyber activity, a physical context feature corresponding to the physical activity, and a social context feature corresponding to the social activity;
       identify a task based on the generated first CPS context and annotation data associated with the first CPS context;
       classify the identified task into a class based on a trained CPS context model, wherein the trained CPS context model relates the identified task to a second CPS context;
       group one or more additional tasks with the identified task to create a group of tasks based on the class of the identified task and the trained CPS context model, wherein the grouping of one or more additional tasks is based on a similarity in magnitudes of dimensions of a cyber vector representation corresponding to the cyber activity, a physical vector representation corresponding to the physical activity, and a social vector representation corresponding to the social activity associated with the first CPS context and the second CPS context;
       retrain the trained CPS context model based at least on the identified task; and
       provide a schedule for the group of tasks.

12. The computer system of claim 11, further comprising computer executable instructions that, when executed, cause the processor to:
   receive the annotation data from a user, wherein the annotation data comprises an in-situ annotation describing the first CPS context.

13. The computer system of claim 12, further comprising computer executable instructions that, when executed, cause the processor to:
   determine a start time of the identified task based at least on the generated first CPS context and the annotation data from the user; and
   determine an end time of the identified task based at least on the generated first CPS context, the annotation data from the user, and the CPS activity data of the user; and
   identify the task based at least on the start time and the end time.

14. The computer system of claim 11, further comprising computer executable instructions that, when executed, cause the processor to:
   retrain the trained CPS context model using Support Vector Machine (SVM).

15. The computer system of claim 11, wherein the group of tasks has a shared CPS context based on:
   a location,
   a time, and
   a person to collaborate with.

* * * * *